(12) United States Patent
Kim et al.

(10) Patent No.: US 9,007,361 B2
(45) Date of Patent: Apr. 14, 2015

(54) IMAGE DISPLAY APPARATUS AND METHOD FOR OPERATING THE SAME

(75) Inventors: Hyerim Kim, Seoul (KR); Seonyoung Sohn, Seoul (KR)

(73) Assignee: LG Electronics Inc., Seoul (KR)

(*) Notice: Subject to any disclaimer, the term of this patent is extended or adjusted under 35 U.S.C. 154(b) by 731 days.

(21) Appl. No.: 13/229,929

(22) Filed: Sep. 12, 2011

(65) Prior Publication Data

US 2012/0113099 A1   May 10, 2012

(30) Foreign Application Priority Data

Sep. 13, 2010 (KR) .................. 10-2010-0089611
Nov. 10, 2010 (KR) .................. 10-2010-0111625

(51) Int. Cl.
| G06T 15/00 | (2011.01) |
| H04N 13/00 | (2006.01) |
| H04N 13/04 | (2006.01) |

(52) U.S. Cl.
CPC ....... *H04N 13/0022* (2013.01); *G09G 2360/16* (2013.01); *H04N 13/0438* (2013.01); *H04N 13/0025* (2013.01)

(58) Field of Classification Search
CPC .......... G09G 2360/16; H04N 13/0022; H04N 13/0025; H04N 13/0438
USPC ........ 345/419, 204, 690; 382/154; 348/43, 42
See application file for complete search history.

(56) References Cited

U.S. PATENT DOCUMENTS

| 7,701,475 | B2* | 4/2010 | Aoki et al. ............... 345/690 |
| 7,907,134 | B2* | 3/2011 | Aoki et al. ............... 345/204 |
| 8,019,146 | B2* | 9/2011 | Koo et al. ................ 382/154 |
| 8,390,674 | B2* | 3/2013 | Kim et al. ................ 348/42 |
| 8,542,909 | B2* | 9/2013 | Caceres et al. ........... 382/154 |
| 8,629,899 | B2* | 1/2014 | Raveendran et al. ....... 348/43 |
| 2008/0112616 | A1 | 5/2008 | Koo et al. ............... 382/171 |
| 2009/0096863 | A1 | 4/2009 | Kim et al. ................ 348/42 |

FOREIGN PATENT DOCUMENTS

| KR | 10-2006-0134309 A | 12/2006 |
| KR | 10-2007-0058302 A | 6/2007 |
| KR | 10-2009-0059380 A | 6/2009 |
| WO | WO 2009/020277 A1 | 2/2009 |

OTHER PUBLICATIONS

Korean Notice of Allowance dated Dec. 21, 2012 issued in Application No. 10-2010-01111625.
European Search Report dated Apr. 9, 2014 issued in Application No. 11 00 7239.4.

* cited by examiner

*Primary Examiner* — Phu K Nguyen
(74) *Attorney, Agent, or Firm* — Ked & Associates, LLP

(57) ABSTRACT

An image display apparatus and a method for operating the same are disclosed. The method for operating an image display apparatus includes receiving a three-dimensional (3D) image, calculating an Average Picture Level (APL) of the 3D image, and changing of a depth of the 3D image according to the calculated APL.

13 Claims, 29 Drawing Sheets

FIG.5
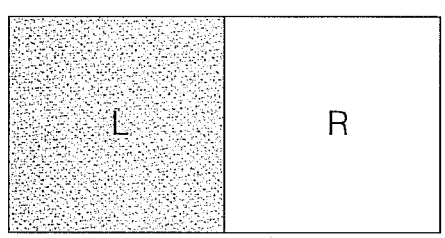
(a)
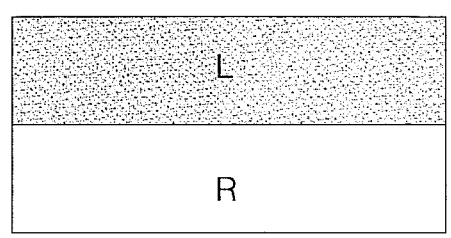
(b)
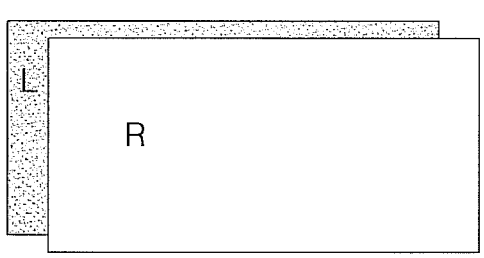
(c)
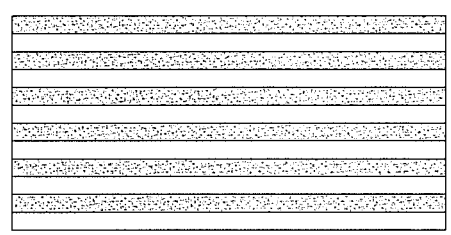
(d)
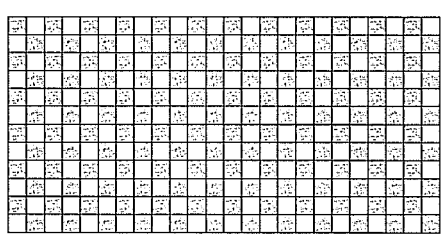
(e)

FIG.6
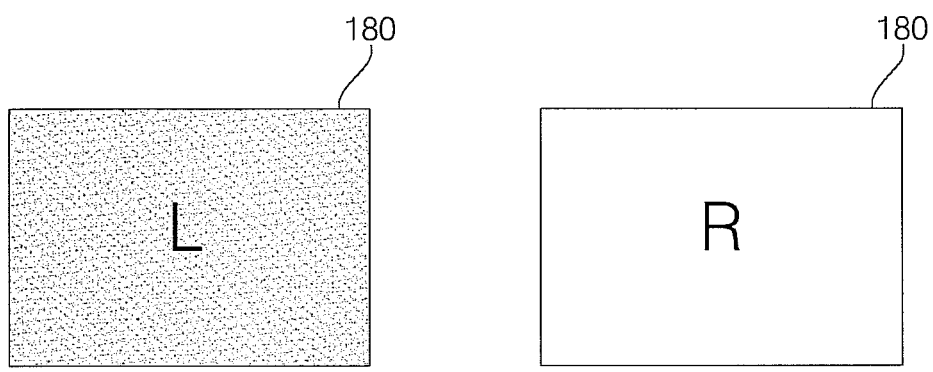
(a) 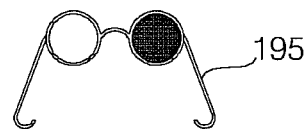     (b) 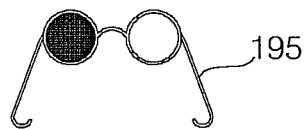

(a)  (b)

(a)                (b)

FIG. 18
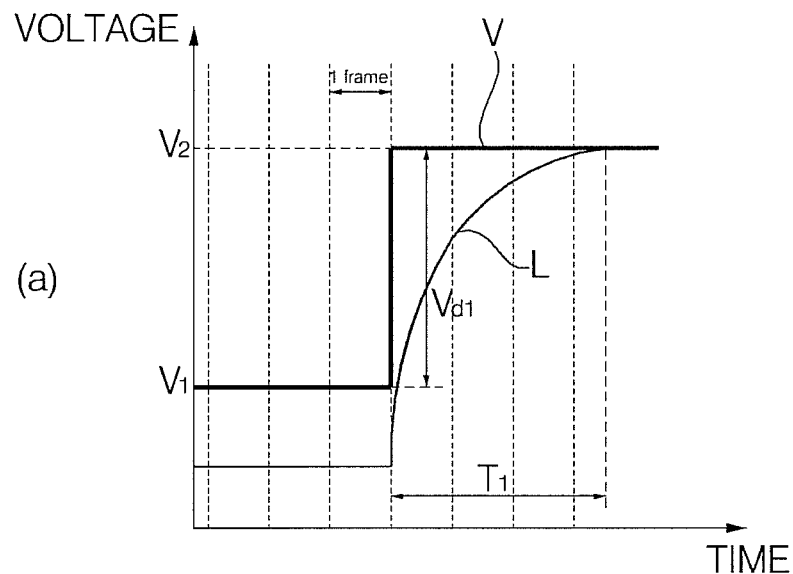
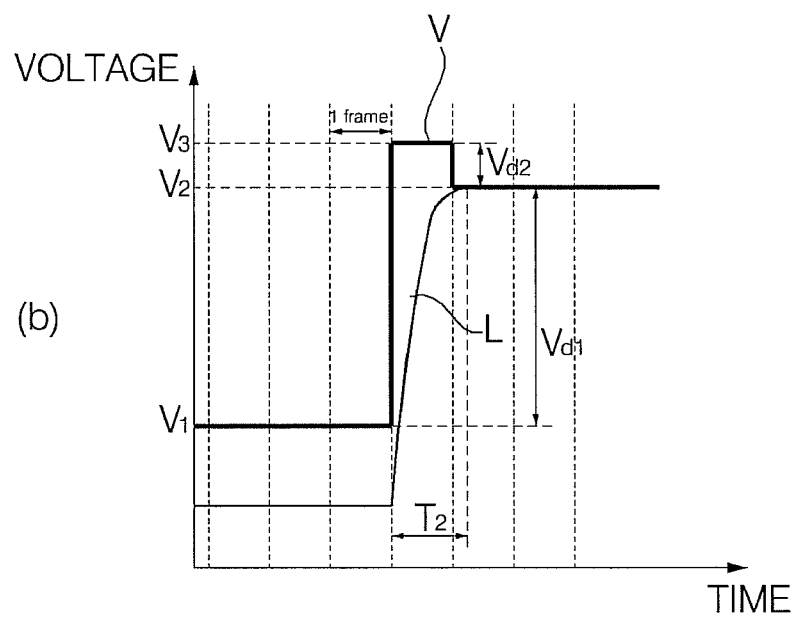

FIG. 19 previous

|  | 0 | 64 | 128 | 192 | 256 |
|---|---|---|---|---|---|
| 0 | 0 | 0 | 0 | 0 | 0 |
| 64 | 74 | 64 | 53 | 42 | 30 |
| 128 | 148 | 139 | 128 | 116 | 101 |
| 192 | 222 | 213 | 204 | 192 | 180 |
| 256 | 256 | 256 | 256 | 256 | 256 | current

FIG. 24
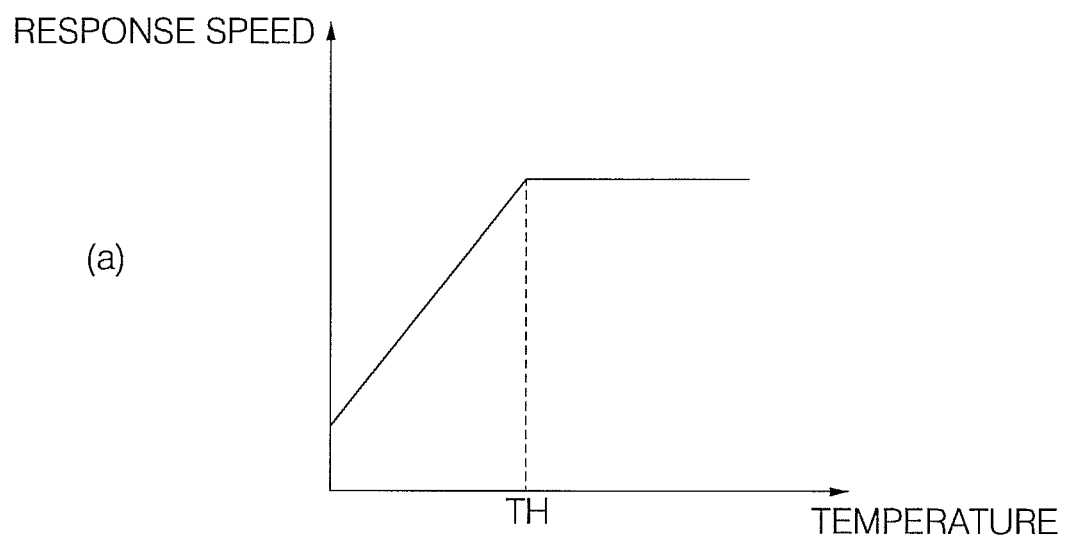
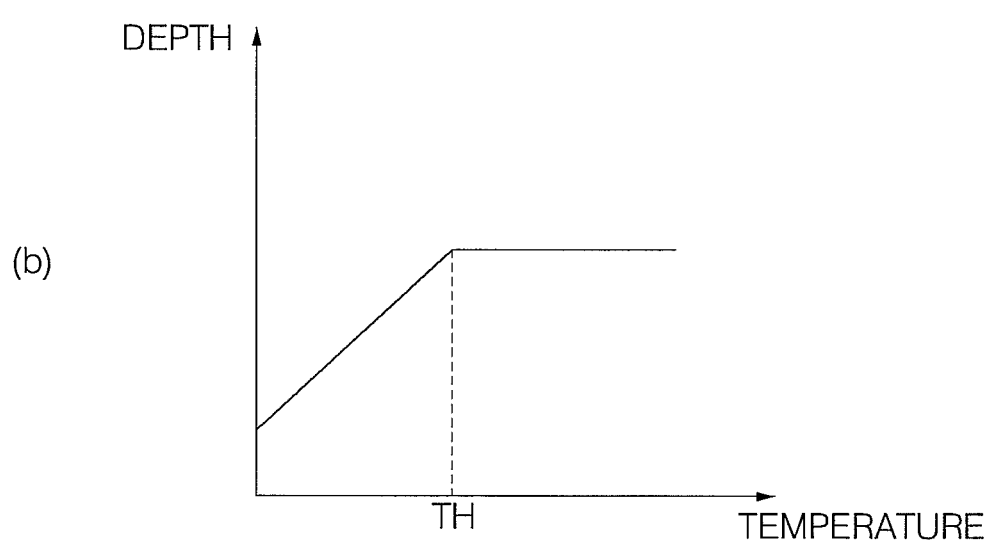

(a)　　　　　　　　　　　　　　　　(b)

IMAGE DISPLAY APPARATUS AND METHOD FOR OPERATING THE SAME

CROSS-REFERENCE TO RELATED APPLICATION

This application claims the benefit of Korean Application Nos. 10-2010-0089611, filed on Sep. 13, 2010, and 10-2010-0111625, filed on Nov. 10, 2010 in the Korean Intellectual Property Office, the disclosure of which are incorporated herein by reference.

BACKGROUND OF THE INVENTION

1. Field of the Invention

The present invention relates to an image display apparatus and a method for operating the same, and more particularly, to an image display apparatus and a method for operating the same, which can decrease crosstalk.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services.

Extensive research has recently been conducted on three-dimensional (3D) images. In addition, 3D stereoscopy has been widely used and commercialized in a variety of environments and technologies.

SUMMARY OF THE INVENTION

Therefore, the present invention has been made in view of the above problems, and it is an object of the present invention to provide an image display apparatus and a method for operating the same, which can decrease crosstalk.

It is another object of the present invention to provide an image display apparatus and a method for operating the same, which can adjust the depth of a 3D image according to the average picture level of the 3D image.

It is another object of the present invention to provide an image display apparatus and a method for operating the same, which can adjust the depth of a 3D image according to temperature.

In accordance with an aspect of the present invention, the above and other objects can be accomplished by the provision of a method for operating an image display apparatus, including receiving a three-dimensional (3D) image, calculating an Average Picture Level (APL) of the 3D image, and changing of a depth of the 3D image according to the calculated APL.

In accordance with another aspect of the present invention, the above and other objects can be accomplished by the provision of a method for operating an image display apparatus, including receiving a 3D image, sensing temperature, and changing a depth of the 3D image according to the sensed temperature.

In accordance with another aspect of the present invention, the above and other objects can be accomplished by the provision of an image display apparatus including an APL calculator to calculate an APL of an input 3D image, a formatter to change a depth of the 3D image according to the calculated APL, and a display to display the 3D image having the changed depth.

In accordance with a further aspect of the present invention, the above and other objects can be accomplished by the provision of an image display apparatus including a temperature sensor to sense temperature, a formatter to change a depth of a 3D image according to the sensed temperature, and a display to display the 3D image having the changed depth.

BRIEF DESCRIPTION OF THE DRAWINGS

The above and other objects, features and other advantages of the present invention will be more clearly understood from the following detailed description taken in conjunction with the accompanying drawings, in which:

FIG. 5 illustrates three-dimensional (3D) formats;

FIG. 6 illustrates operations of a 3D viewing device according to a 3D format illustrated in FIG. 5;

FIGS. 10 to 22 are views referred to for describing various examples of the method for operating an image display apparatus, illustrated in FIG. 9;

FIGS. 24 to 29 are views referred to for describing various examples of the method for operating an image display apparatus, illustrated in FIG. 23.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
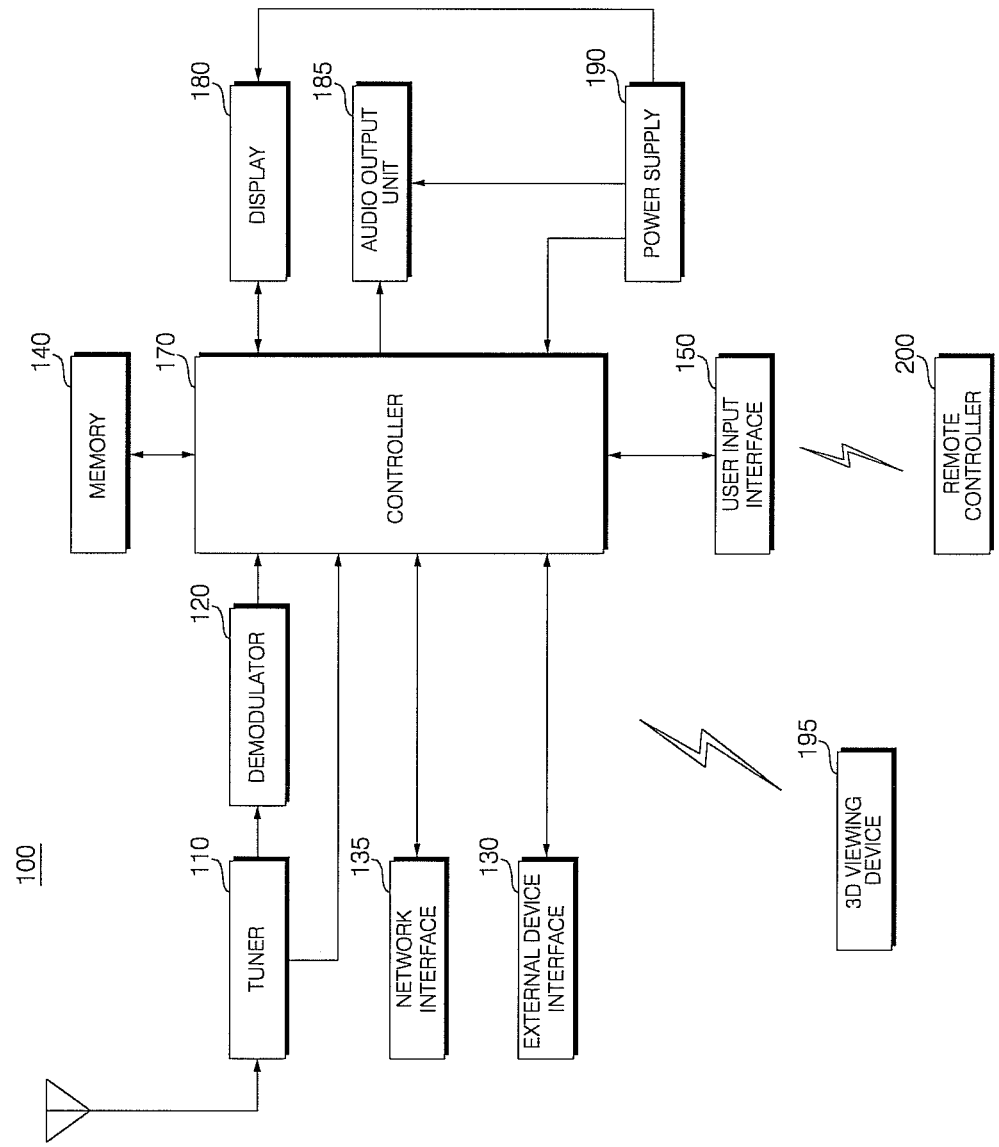
FIG. 1 is a block diagram of an image display apparatus according to an embodiment of the present invention.

FIG. 1 is a block diagram of an image display apparatus according to an embodiment of the present invention.

Referring to FIG. 1, an image display apparatus 100 according to an embodiment of the present invention includes a tuner 110, a demodulator 120, an external device interface 130, a network interface 135, a memory 140, a user input interface 150, a controller 170, a display 180, a temperature sensor 183, an audio output unit 185, a power supply 190, and a three-dimensional (3D) viewing device 195.

The tuner 110 selects a Radio Frequency (RF) broadcast signal corresponding to a channel selected by a user or a number of RF broadcast signals corresponding to all broadcast channels previously added to the image display apparatus 100 from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. That is, the first tuner 120 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

In addition, the tuner 110 may sequentially select a number of RF broadcast signals corresponding to all broadcast channels previously added to the image display apparatus 100 by a channel add function from among a plurality of RF signals received through the antenna, and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF received from the tuner 110, thereby obtaining a stream signal TS. The stream signal TS may be a signal in which a video signal, an audio signal and a data signal are multiplexed. For example, the stream signal TS 1 may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170. The controller 170 may demultiplex the stream signal TS into a number of signals, process the demultiplexed signals, and output the processed signals as video data to the display 180 and as audio data to the audio output unit 185.

The external device interface 130 may connect an external device to the image display apparatus 100. For the purpose, the external device interface 130 may include an A/V Input/Output (I/O) unit (not shown) and a wireless communication module (not shown).

The external device interface 130 is connected wirelessly or by cable to an external device such as a Digital Versatile Disc (DVD) player, a Bluray player, a game console, a camera, a camcorder, or a computer (e.g., a laptop computer). Then, the external device interface 130 externally receives video, audio, and/or data signals from the external device and transmits the received external input signals to the controller 170. In addition, the external device interface 130 may output video, audio, and data signals processed by the controller 170 to the external device. For this purpose, the external device interface 130 may include an A/V I/O unit (not shown) or a wireless communication module (not shown).

In order to receive or transmit A/V signals from or to the external device, the A/V I/O unit of the external device interface 130 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 130 may conduct short-range communication with other electronic devices. For the short-range communication, the wireless communication module may be connected to other electronic devices over a network according to communication standards such as Bluetooth, Radio Frequency Identification (RFID), Infrared Data Association (IrDA), Ultra WideBand (UWB), and Zigbee.

The external device interface 130 may be connected to various set-top boxes through at least one of the aforementioned ports and may thus receive data from or transmit data to the various set-top boxes.

The external device interface 130 may transmit data to or receive data from the 3D viewing device 195.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WLAN) (i.e. Wi-Fi), Wireless Broadband (WiBro), World Interoperability for Microwave Access (WiMax), and High Speed Downlink Packet Access (HSDPA).

The network interface 135 may receive content or data from the Internet, a content provider, or a network provider over a network. The received content or data may include content such as movies, advertisements, games, Video-on-Demand (VoD) files, and broadcast signals, and information related to the content. The network interface 135 may also receive update information and update files of firmware from a network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), and Internet TV and full-browsing TV which are capable of providing Internet access services.

The memory 140 may store various programs necessary for the controller 170 to process and control signals, and may also store processed video, audio and data signals.

The memory 140 may temporarily store a video, audio or data signal received from the external device interface 130. The memory 140 may store information about broadcast channels identified through the channel add function, such as a channel map.

The memory 140 may include, for example, at least one of a flash memory-type storage medium, a hard disk-type storage medium, a multimedia card micro-type storage medium, a card-type memory (e.g. an SD or XD memory), a Random Access Memory (RAM), or an Electrically Erasable Programmable ROM (EEPROM). The image display apparatus 100 may open a file (such as a video file, a still image file, a music file, or a text file) stored in the memory 140 to the user.

While the memory 140 is shown in FIG. 1 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal received from a sensor unit (not shown) that senses a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 130 and process the demultiplexed signals so that the processed signals can be output as audio and video data.

The video signal processed by the controller 170 may be displayed as an image on the display 180. The video signal processed by the controller 170 may also be transmitted to an external output device through the external device interface 130.

The audio signal processed by the controller 170 may be output as sound to the audio output unit 185. Also, the audio signal processed by the controller 170 may be transmitted to the external output device through the external device interface 130.

While not shown in FIG. 1, the controller 170 may include a demultiplexer (DEMUX) and a video processor, which will be described later with reference to FIG. 4.

In addition, the controller 170 may provide overall control to the image display apparatus 100. For example, the controller 170 may control tuning of the tuner 110 to an RF broadcast corresponding to a user-selected channel or a pre-stored channel.

The controller 170 may control the image display apparatus 100 according to a user command received through the user input interface 150 or according to an internal program.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 130 to the display 180 or to the audio output unit 185 according to an external device video play command received through the external device interface 150.

The controller 170 may control display of images on the display 180. For instance, the controller 170 may control the display 180 to display a broadcast image received from the tuner 110, an external image received through the external device interface 130, an image received through the network interface 130, or an image stored in the memory 140.

The image displayed on the display 180 may be a two-dimensional (2D) or 3D still image or moving picture.

The controller 170 controls a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or without encoding. Also, it is possible to encode the thumbnail images into a stream and output the stream to the controller 170. The controller 170 may display a thumbnail list including a plurality of received thumbnail images on the display 180. The thumbnail list may be displayed on a part of the display 180 with an image displayed on the display 180, that is, as a compact view, or the thumbnail list may be displayed in fullscreen on the display 180.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 is preferably capable of displaying 3D images according to an embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

According to an embodiment of the present invention, the 3D viewing device 195 is used to allow the user to view 3D images. The 3D viewing device 195 corresponds to the above-described additional display. The following description will be made mainly in the context of the 3D viewing device 195 being shutter glasses.

The display 180 may also be a touch screen that can be used not only as an output device but also as an input device.

The temperature sensor 183 senses the inner or ambient temperature of the image display apparatus 100, especially the ambient temperature of the display 180. For example, when the display 180 includes a liquid crystal panel 210, the response speed of liquid crystals in the liquid crystal panel 210 varies with temperature and thus temperature may be sensed for use in displaying a 3D image. For this purpose, information indicating the sensed temperature may be provided to the controller 170.

To sense the temperature of the liquid crystal panel 210, a thermistor whose resistance varies with temperature may be used. A Negative Temperature Coefficient (NTC) thermistor is one in which resistance decreases with an increase in temperature, whereas a Positive Temperature Coefficient (PTC) thermistor is one in which resistance increases with an increase in temperature.

For example, a variation in voltage with respect to a change in the temperature of the liquid crystal panel 210 may be sensed using a thermistor in a bias voltage generator (not shown) that generates a turn-on voltage $V_{gh}$ for the gate end of a gate driver.

The audio output unit 185 may receive a processed audio signal (e.g., a stereo signal, a 3.1-channel signal or a 5.1-channel signal) from the controller 170 and output the received audio signal as voice. The audio output unit 185 may be various types of speakers.

To sense a user's gesture, the image display apparatus 100 may further include the sensor unit (not shown) that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by the camera unit or a signal sensed by the sensor unit, or by combining the captured image and the sensed signal.

The power supply 190 supplies power to the whole image display apparatus 100, particularly to the controller 170 that may be configured into a System On Chip (SOC), the display 180 for displaying images, and the audio output unit 185 for outputting audio data.

The remote controller 200 transmits a user input to the user input interface 150. For the transmission of a user input, the remote controller 200 may communication operate based on various communication standards such as Bluetooth, RF communication, IR, UWB and Zigbee. In addition, the remote controller 200 may receive a video signal, audio signal and/or data signal from the user input interface 150 and output the received signal as an image or sound.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcast terminal, a Personal Digital Assistant (PDA), a Portable Multimedia Player (PMP), etc.

The block diagram of the image display apparatus 100 illustrated in FIG. 1 is an exemplary embodiment of the present invention. The image display apparatus 100 is shown in FIG. 1 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

The following description is given with the appreciation that the image display apparatus 100 is capable of displaying 3D images and is an LCD panel-based display with a backlight unit.

Figure 2:
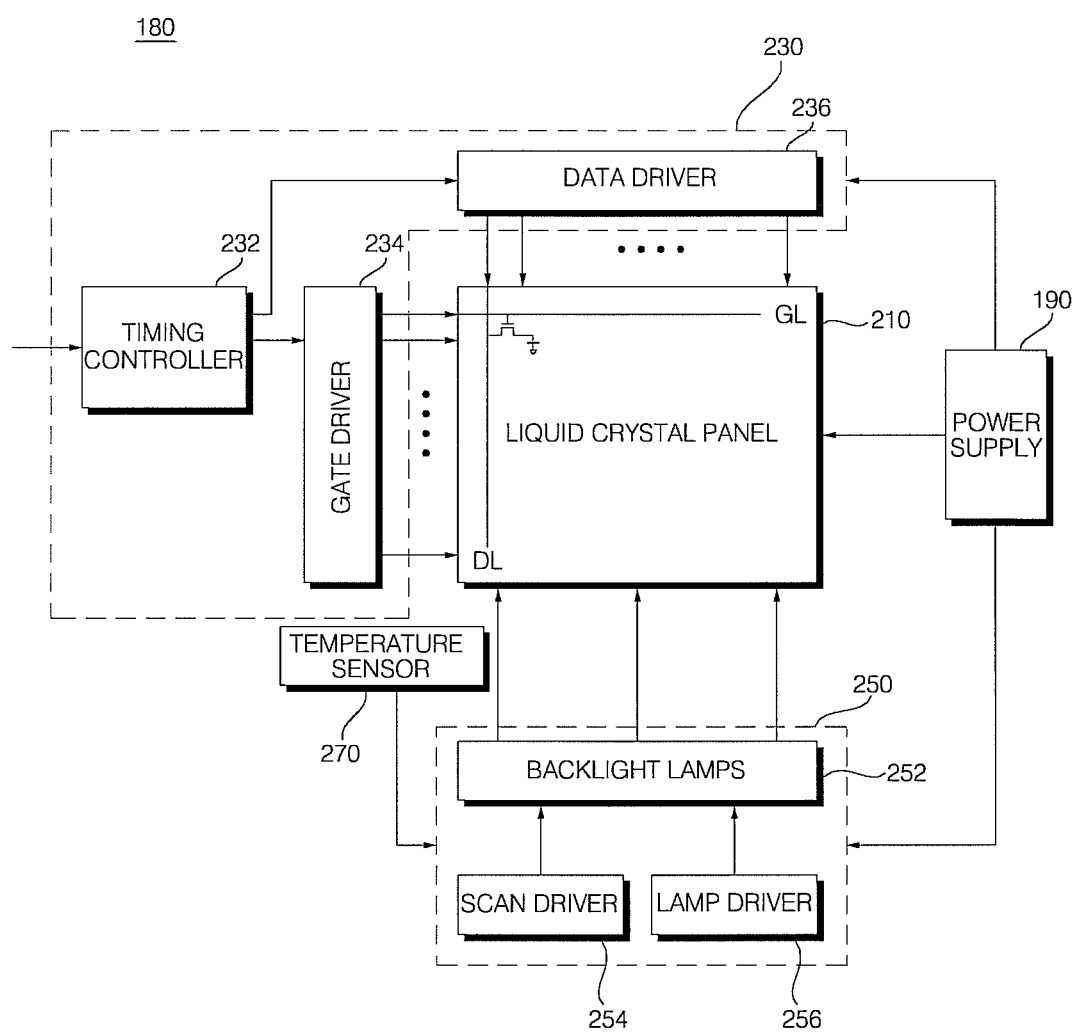
FIG. 2 is an exemplary block diagram of a power supply and a display illustrated in FIG. 1.

FIG. 2 is a block diagram of the power supply and the display illustrated in FIG. 1.

Referring to FIG. 2, the LCD panel-based display 180 includes the liquid crystal panel 210, a driving circuit 230, and a backlight unit 250.

The liquid crystal panel 210 has a first substrate, a second substrate, and a liquid crystal layer between the first and second substrates. On the first substrate, a plurality of gate lines GL and a plurality of data lines DL form a matrix, intersecting each other, and thin-film transistors and pixel electrodes connected to the thin-film transistors are provided at the intersections. Common electrodes are provided on the second substrate.

The driving circuit 230 drives the liquid crystal panel 210 according to control signals and data signals received from the controller 170 illustrated in FIG. 1. To drive the liquid crystal panel 210, the driving circuit 230 includes a timing controller 232, a gate driver 234, and a data driver 236.

The timing controller 232 receives a control signal, an RGB data signal, and a vertical synchronization signal $V_{sync}$ from the controller 170, controls the gate driver 234 and the data driver 236 according to the control signal, re-arranges the RGB data signal, and provides the re-arranged RGB data signal to the data driver 236.

The timing controller 232 may include a gray level controller 300 for adjusting the gray level of a current frame of an input image according to the gray level difference between the current frame and a previous frame of the input image. For example, an RGB data signal of the current frame may be adjusted based on the gray level difference between the RGB data signals of the current frame and the previous frame, which will be described later with reference to FIG. 3.

The gate driver 234 and the data driver 236 provide a scan signal and a video signal to the liquid crystal panel 210 through the gate lines GL and the data lines DL under the control of the timing controller 232.

The backlight unit 250 illuminates the liquid crystal panel 210. Thus the backlight unit 250 may include a plurality of backlight lamps 252 as light sources, a scan driver 254 for controlling the scanning driving of the backlight lamps 252, and a lamp driver 256 for turning on or off the backlight lamps 252.

When the backlight lamps 252 are turned on, light is projected onto the frontal surface of the liquid crystal panel 210 by means of a diffuser sheet (not shown) that diffuses incident light from the backlight lamps 252, a reflection sheet (not shown) that reflects the light, and an optical sheet (not shown) that polarizes, scatters, and diffuses the light.

The backlight lamps 252 may be arranged across the rear surface of the liquid crystal panel 210, especially sequentially. A display with this backlight layout is called a direct type. Compared to the direct type, the backlight lamps 252 may be arranged on the rear surface of the liquid crystal panel 210, especially on upper and lower sides of the rear surface of the liquid crystal panel 210. A display with this layout of backlight lamps is called an edge type.

The backlight lamps 252 may be turned on simultaneously or sequentially on a block basis. The backlight lamps 252 may be Light Emitting Diodes (LEDs).

An image is displayed by light emitted from the backlight unit 250, with the light transmittance of the liquid crystal layer controlled using the electrical field between the pixel electrodes and the common electrodes of the liquid crystal panel 210.

The power supply 190 may supply a common electrode voltage $V_{com}$ to the liquid crystal panel 210 and a gamma voltage to the data driver 236. In addition, the power supply 190 supplies a driving voltage to the backlight unit 250 in order to drive the backlight lamps 252.

Figure 3:
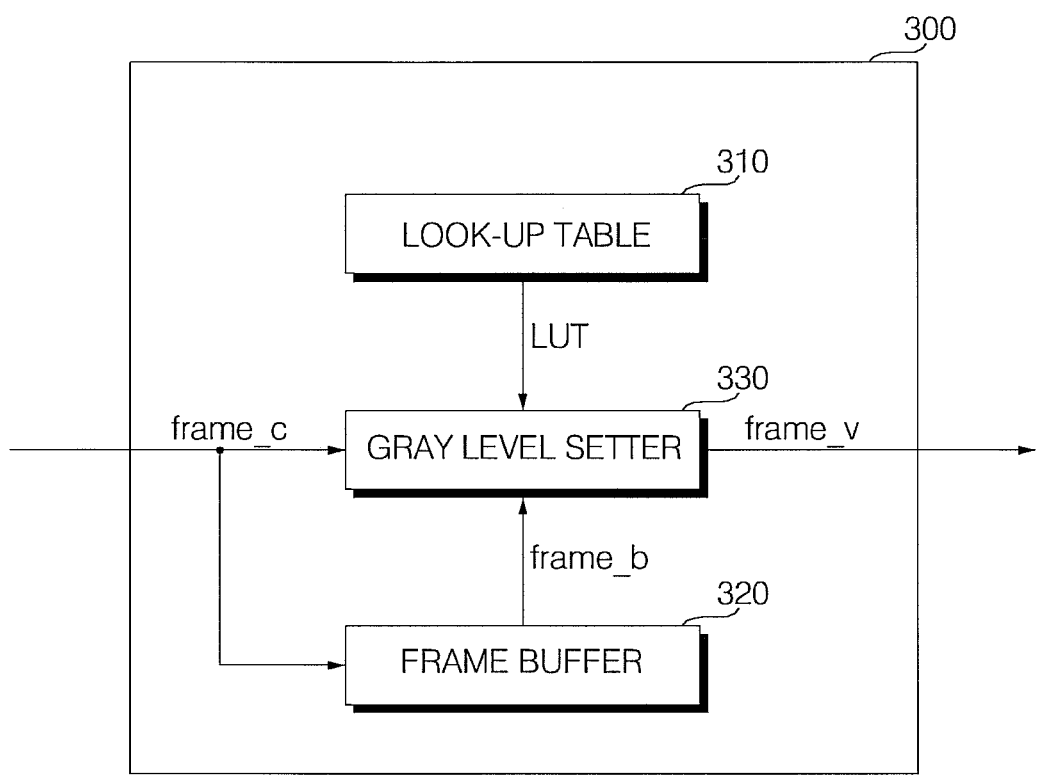
FIG. 3 is a block diagram of a gray level controller according to an embodiment of the present invention.

FIG. 3 is a block diagram of a gray level controller according to an embodiment of the present invention.

Referring to FIG. 3, the gray level controller 300 according to the embodiment of the present invention may be located inside the timing controller 232, which should not be construed as limiting the present invention. The gray level controller 300 may be placed at the frontal end of the timing controller 232. The following description will be given on the assumption that the gray level controller 300 resides in the timing controller 232.

The gray level controller 300 controls the gray level of an input image. To control the gray level, the gray level controller 300 includes a look-up table 310, a frame buffer 320, and a gray level setter 330.

The look-up table 310 tabulates gray level data (i.e. overdriving (OD) data) which is set based on the gray levels of current and previous frames. For example, if the current and previous frames have an identical gray level, the same gray level may be set. If the gray level of the current frame is greater than the gray level of the previous frame, a higher gray level than the gray level of the current frame may be set. Gray level control will be described later with reference to FIG. 19.

Meanwhile, the controller 170 or the memory 140 may provide the OD data to the look-up table 310 of the gray level controller 300.

The gray level setter 330 may set a gray level, referring to gray level data LUT set in the look-up table 310.

The frame buffer 320 buffers a current frame frame_c received from the controller 170 and a previous frame frame_b.

The frame buffer 320 provides the previous frame frame_b to the gray level setter 330.

If the input image is a 3D image, the frame buffer 320 may buffer left-eye and right-eye images arranged by the formatter 460 of the controller 170.

The gray level setter 330 may change the gray level of the current frame frame_c using the current frame frame_c, the previous frame frame_b, and the gray level data LUT of the look-up table 310.

Meanwhile, the gray level setter 330 may control the gray level of the current frame frame_c according to the frame rate of the current frame frame_c. For example, as the frame rate of the current frame frame_c increases, the gray level of the current frame frame_c may be changed more.

Further, the gray level setter 330 may change the gray level of the current frame frame_c according to the inner temperature or ambient temperature of the image display apparatus 100. For instance, the gray level variation of the current frame frame_c may increase with lower temperature.

The gray level-controlled current frame frame_v may be re-arranged in the timing controller 232. Specifically, the RGB data signal of the gray level-controlled current frame frame_v may be rearranged and provided to the data driver 236.

Figure 4:
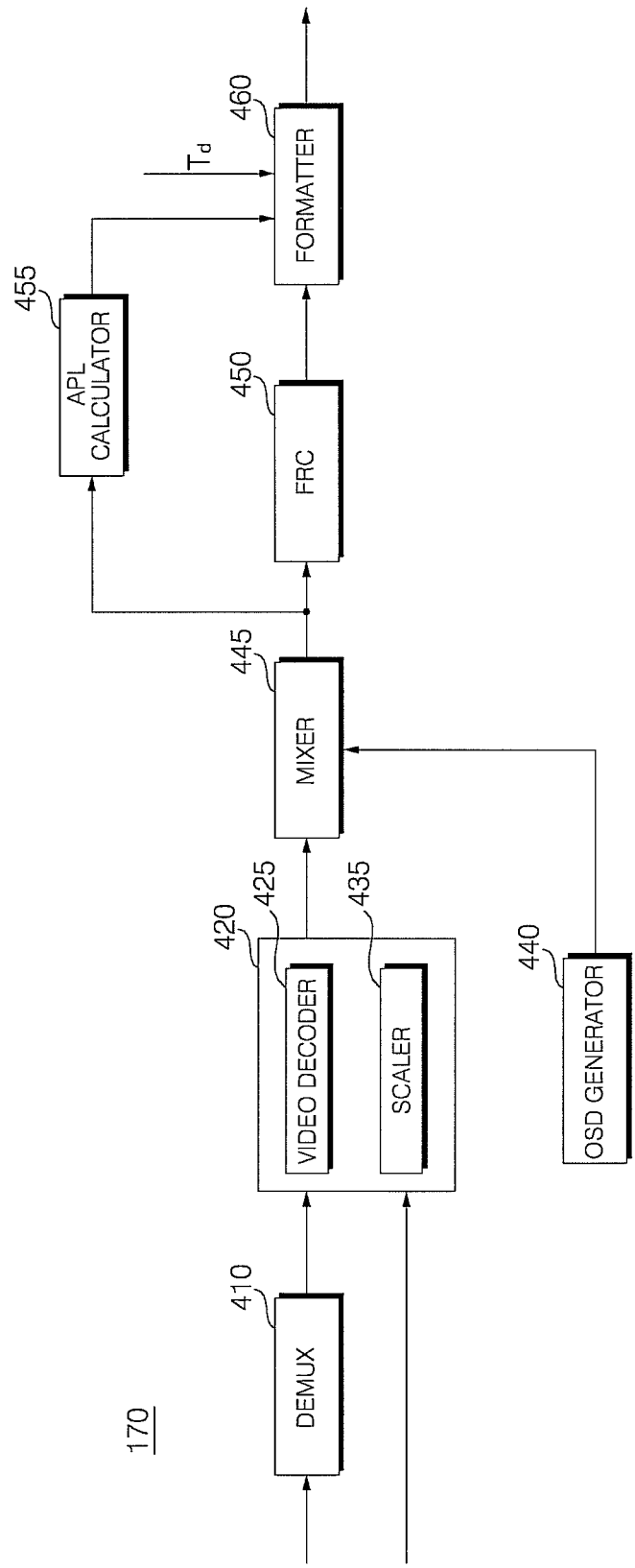
FIG. 4 is a block diagram of a controller illustrated in FIG. 1.

FIG. 4 is a block diagram of the controller illustrated in FIG. 1, FIG. 5 illustrates 3D formats, and FIG. 6 illustrates operations of the 3D viewing device according to a 3D format illustrated in FIG. 5.

Referring to FIG. 4, the controller 170 may include a DEMUX 410, a video processor 420, an OSD generator 440, a mixer 445, a Frame Rate Converter (FRC) 450, an Average Picture Level (APL) calculator 455, and a formatter 460 according to an embodiment of the present invention. The controller 170 may further include an audio processor (not shown) and a data processor (not shown).

The DEMUX 410 demultiplexes an input stream. For example, the DEMUX 410 may demultiplex an MPEG-2 TS into a video signal, an audio signal, and a data signal. The input stream signal may be received from the tuner 110, the demodulator 120 or the external device interface 130.

The video processor 420 may process the demultiplexed video signal. For the video signal processing, the video processor 420 may include a video decoder 425 and a scaler 435.

The video decoder 425 decodes the demultiplexed video signal and the scaler 435 scales the resolution of the decoded video signal so that the video signal can be displayed on the display 180.

The video decoder 425 may be provided with decoders that operate based on various standards.

If the demultiplexed video signal is an MPEG-2 coded 2D video signal, the video signal may be decoded by an MPEG-2 decoder.

If the demultiplexed video signal is, for example, an H.264-encoded DMB or DVB-handheld (DVB-H) signal, the video signal may be decoded by an H.264 decoder. If the video signal is an MPEC-C part 3 depth video signal, a Multi-View Video Coding (MVC) video signal, or a Free-viewpoint TV (FTV) video signal, the video signal may be decoded by an MPEC-C decoder, an MVC decoder, or an FTV decoder.

The decoded video signal processed by the video processor 420 may be a 2D video signal, a 3D video signal, or a combination of both.

The video processor 420 may determine whether the demultiplexed video signal is a 2D or 3D video signal. For example, a broadcast signal received from the tuner 110, an external signal received from an external device, or an external signal received over a network may be a 3D video signal. The video processor 420 may determine whether an input stream is a 3D video signal, referring to a 3D flag set in the header of the stream, 3D metadata of the stream, or 3D format information about the stream.

The decoded video signal from the video processor 420 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, 3D formats illustrated in FIG. 5 are available. The 3D formats are a side-by-side format (FIG. 5(*a*)), a top/down format (FIG. 5(*b*)), a frame sequential format (FIG. 5(*c*)), an interlaced format (FIG. 5(*d*)), and a checker box format (FIG. 5(*e*)). A left-eye image L and a right-eye image R are arranged side by side in the side by side format. The left-eye image L and the right-eye image R are stacked vertically in the top/down format, while they are arranged in time division in the frame sequential format. In the interlaced format, the left-eye image L and the right-eye image R alternate line by line. The left-eye image L and the right-eye image R are mixed on a box basis in the checker box format.

The OSD generator 440 generates an OSD signal autonomously or according to a user input. For example, the OSD generator 440 may generate signals by which a variety of information is displayed as graphics or text on the display 180, according to user input signals or control signals. The OSD signal may include various data such as a User Interface (UI), a variety of menus, widgets, icons, etc. Also, the OSD signal may include a 2D object and/or a 3D object.

The mixer 445 may mix the decoded video signal processed by the video processor 420 with the OSD signal generated from the OSD generator 440. The OSD signal and the decoded video signal each may include at least one of a 2D signal or a 3D signal.

The FRC 450 may change the frame rate of the mixed video signal received from the mixer 445. For example, a frame rate of 60 Hz is converted into a frame rate of 120 or 240 Hz. When the frame rate is changed from 60 Hz to 120 Hz, the same first frame is inserted between a first frame and a second frame, or a third frame predicted from the first and second frames is inserted between the first and second frames. If the frame rate is changed from 60 Hz to 240 Hz, three identical frames or three predicted frames are inserted between the first and second frames.

The APL calculator 455 calculates the APL of an input image, particularly the APL of a 3D image in an embodiment of the present invention. A picture level may represent luminance. The APL calculator 455 may calculate an APL on a frame basis or on a block basis. Therefore, if the APL of a frame or a block is high, this means that the average luminance of the frame or block is high.

The formatter 460 may separate a 2D video signal and a 3D video signal from the mixed video signal of the OSD signal and the decoded video signal received from the mixer 445.

Herein, a 3D video signal refers to a signal including a 3D object such as a Picture-In-Picture (PIP) image (still or moving), an EPG that describes broadcast programs, a menu, a widget, text, an object within an image, a person, a background, or a Web page (e.g. from a newspaper, a magazine, etc.).

The formatter 460 may change the format of the 3D video signal, for example, to one of the 3D formats illustrated in FIG. 5. Accordingly, the 3D viewing device 195 may operate according to a 3D format as illustrated in FIG. 6.

FIG. 6(*a*) illustrates an exemplary operation of shutter glasses as the 3D viewing device 195, when the formatter 460 outputs a 3D video signal in the frame sequential format illustrated in FIG. 5.

Referring to FIG. 6(*a*), when the left-eye image L is displayed on the display 180, the left lens is open and the right lens is shut off in the shutter glasses 195. When the right-eye image R is displayed on the display 180, the left lens is shut off and the right lens is open in the shutter glasses 195.

FIG. 6(*b*) illustrates an exemplary operation of polarized glasses as the 3D viewing device 195, when the formatter 460 outputs a 3D video signal in the side by side format illustrated in FIG. 5. The polarized glasses 195 are a passive type and their left and right lenses are maintained open.

Meanwhile, the formatter 460 may convert a 2D video signal to a 3D video signal. For example, the formatter 460 may detect edges or a selectable object from the 2D video signal and generate a 3D video signal with an object based on the detected edges or the selectable object. As described before, the 3D video signal may be separated into left-eye and right-eye image signals L and R.

The formatter 460 may change the depth of a 3D image according to the APL of the 3D image calculated by the APL calculator 455. For this purpose, the disparity (i.e. distance) between the left-eye and right-eye images of the 3D image may be adjusted. Especially when the APL is equal to or lower than a first threshold Low_th or when the APL is equal to or higher than a second threshold High_th, the depth is decreased. The depth control will be described later with reference to FIG. 9.

The formatter 460 may adjust the depth of a 3D image according to temperature $T_d$ sensed by the temperature sensor 183. For this purpose, the disparity (i.e. distance) between the left-eye and right-eye images of the 3D image may be adjusted. Specifically, when the sensed temperature is equal to or higher than a threshold temperature TH, the depth may be set in proportion to the sensed temperature, which will be described later with reference to FIG. 23.

The audio processor (not shown) of the controller 170 may process the demultiplexed audio signal. For the audio signal processing, the audio processor may have a plurality of decoders.

If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2-Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The audio processor of the controller 170 may also adjust the bass, treble, and volume of the audio signal.

The data processor (not shown) of the controller 170 may process the data signal obtained by demultiplexing the input stream signal. For example, if the data signal is a coded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

While it is shown in FIG. 4 that the mixer 445 mixes signals received from the OSD generator 440 and the video processor 420 and then the formatter 460 performs 3D processing on the mixed signal, to which the present invention is not limited, the mixer 445 may be positioned after the formatter 460. Thus the formatter 460 may perform 3D processing on a signal received from the video processor 420, the OSD generator 440 may generate an OSD signal and subject the OSD signal to 3D processing, and then the mixer 445 may mix the processed 3D signals received from the formatter 460 and the OSD generator 440.

The block diagram of the image display apparatus 100 illustrated in FIG. 4 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Especially, the FRC 450 and the formatter 460 may be configured separately outside the controller 170.

Figure 7:
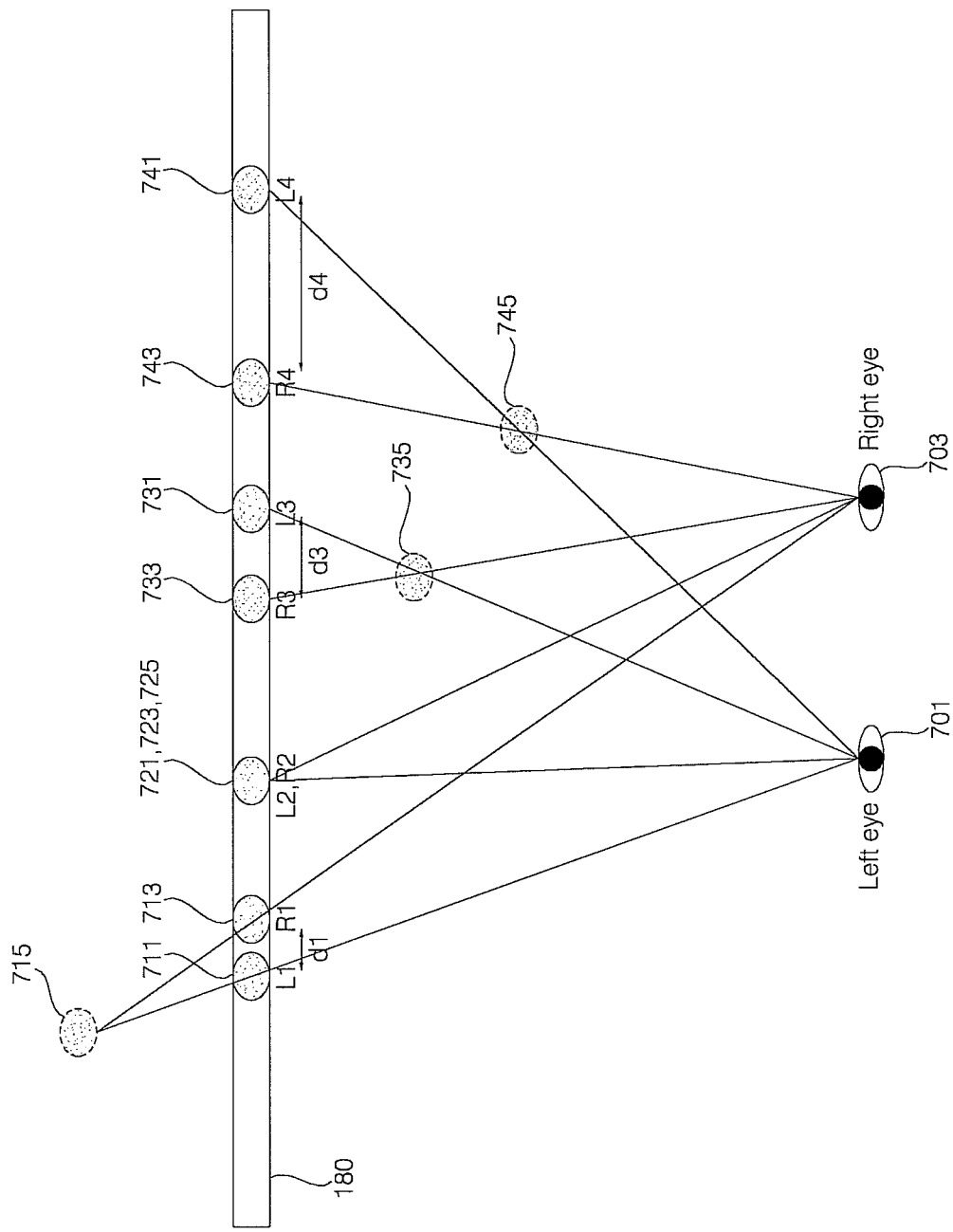
FIG. 7 illustrates formation of 3D images by combining left-eye and right-eye images.
Figure 8:
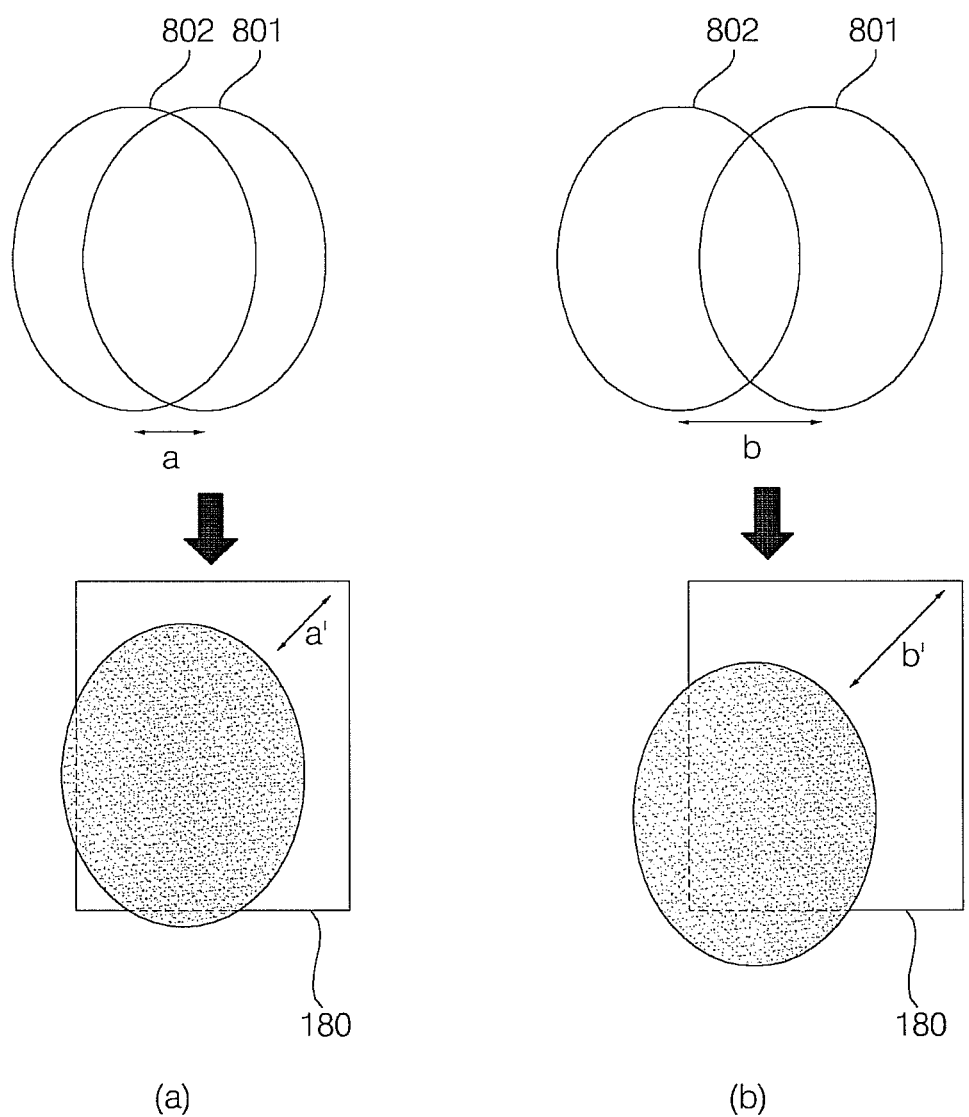
FIG. 8 illustrates different depth illusions of 3D images according to different disparities between a left-eye image and a right-eye image.

FIG. 7 illustrates formation of 3D images by combining left-eye and right-eye images, and FIG. 8 illustrates different depth illusions according to different disparities between a left-eye image and a right-eye image.

Referring to FIG. 7, there are a plurality of images or objects 715, 725, 735 and 745.

A first object 715 is created by combining a first left-eye image 711 (L1) based on a first left-eye image signal with a first right-eye image 713 (R1) based on a first right-eye image signal, with a disparity d1 between the first left-eye and right-eye images 711 and 713. The user sees an image as formed at the intersection between a line connecting a left eye 701 to the first left-eye image 711 and a line connecting a right eye 703 to the first right-eye image 713. Therefore, the user is tricked into perceiving the first object 715 as behind the display 180.

As a second object 725 is created by overlapping a second left-eye image 721 (L2) with a second right-eye image 723 (R2) on the display 180, thus with a disparity of 0 between the second left-eye and right-eye images 721 and 723. Thus, the user perceives the second object 725 as on the display 180.

A third object 735 is created by combining a third left-eye image 731 (L3) with a third right-eye image 733 (R3), with a disparity d3 between the third left-eye and right-eye images 731 and 733. A fourth object 745 is created by combining a fourth left-eye image 741 (L4) with a fourth right-eye image 743 (R4), with a disparity d4 between the fourth left-eye and right-eye images 741 and 743.

The user perceives the third and fourth objects 735 and 745 at image-formed positions, that is, as being positioned before the display 180.

Because the disparity d4 between the fourth left-eye and right-eye images 741 and 743 is larger than the disparity d3 between the third left-eye and right-eye images 731 and 733, the fourth object 745 appears more protruding than the third object 735.

In embodiments of the present invention, the distances between the display 180 and the objects 715, 725, 735 and 745 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIG. 8, the disparity a between a left-eye image 801 and a right-eye image 802 in FIG. 8(a) is smaller than the disparity b between the left-eye image 801 and the right-eye image 802 in FIG. 8(b). Consequently, the depth a' of a 3D object created in FIG. 8(a) is smaller than the depth b' of a 3D object created in FIG. 8(b).

In the case where a left-eye image and a right-eye image are combined to a 3D image, if the left-eye and right-eye images of 3D images are apart from each other by different disparities, the 3D images are perceived to the user as formed at different positions. This means that the depth of a 3D image or 3D object formed with a left-eye image and a right-eye image in combination may be controlled by adjusting the disparity of the left-eye and right-eye images.

Figure 9:
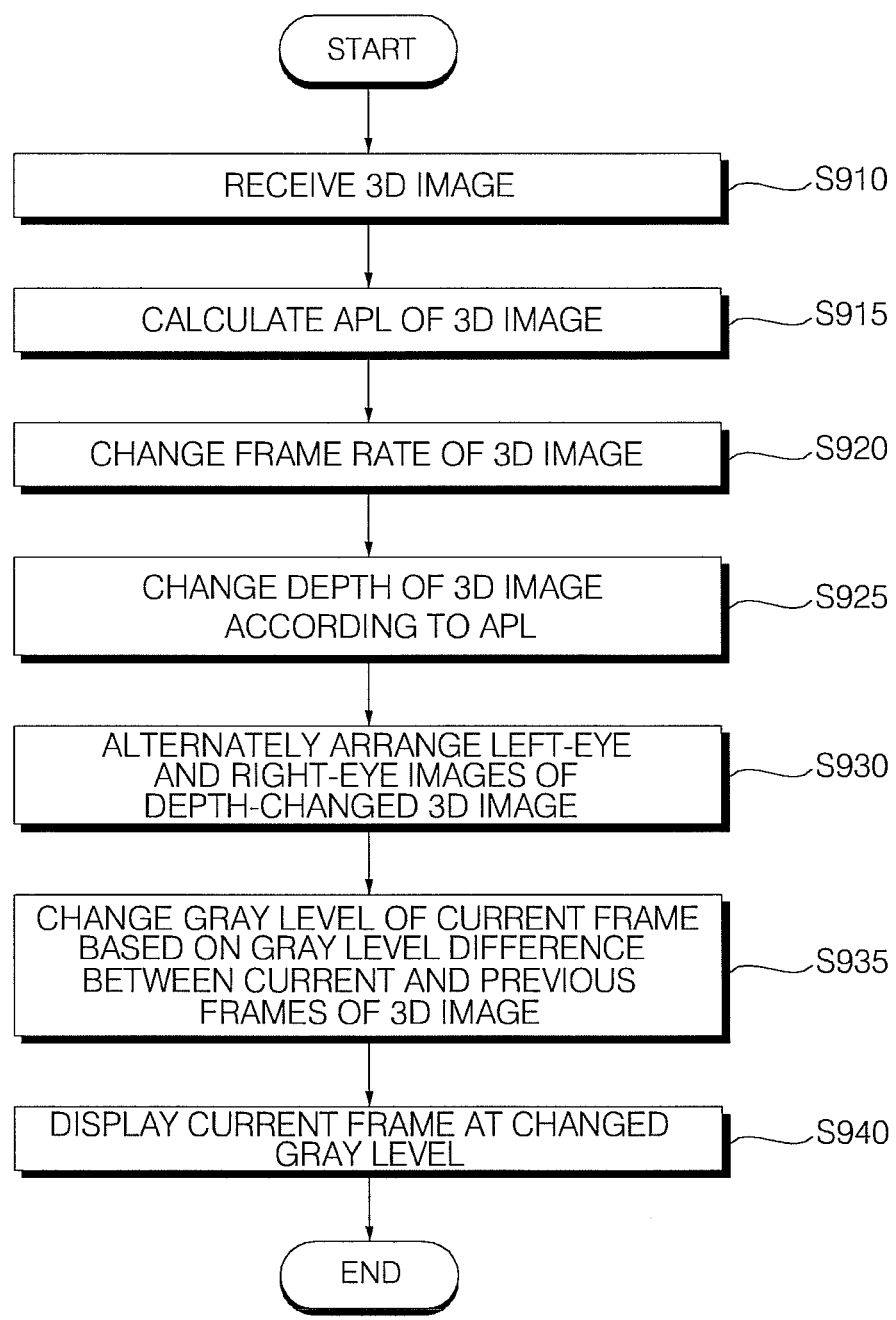
FIG. 9 is a flowchart illustrating a method for operating an image display apparatus according to an embodiment of the present invention.
Figure 10:
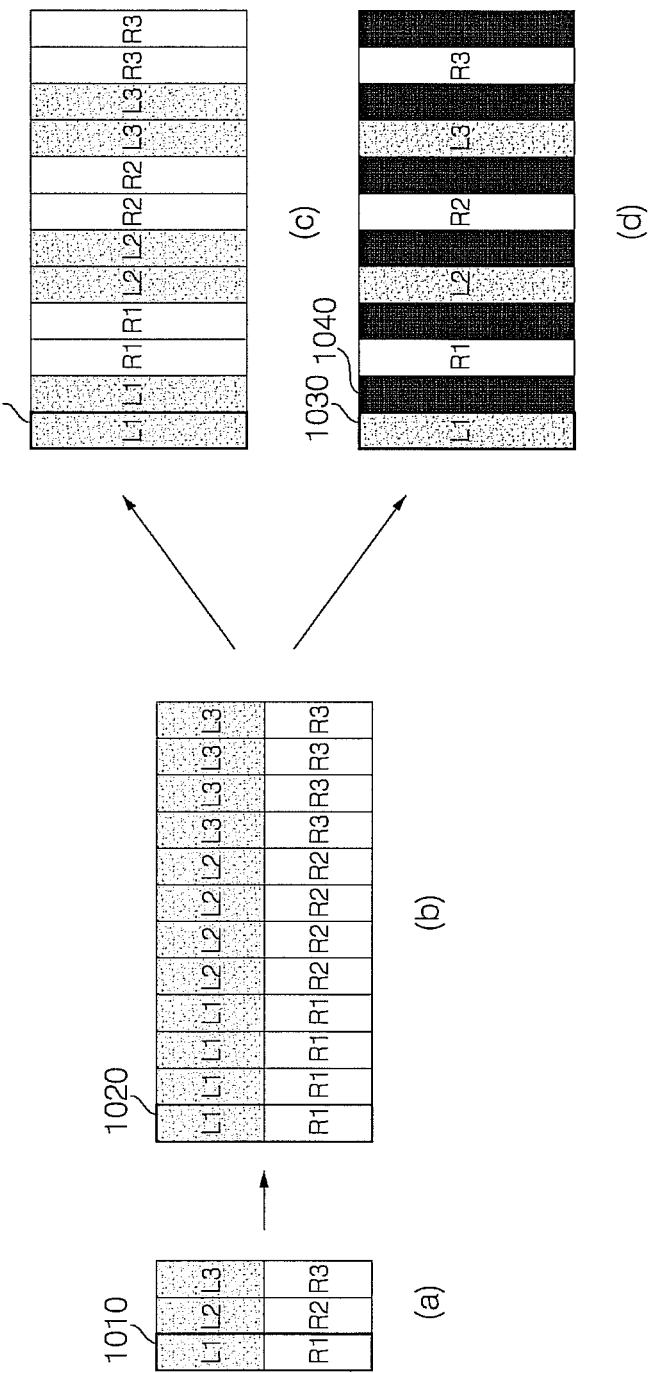

FIG. 9 is a flowchart illustrating a method for operating an image display apparatus according to an embodiment of the present invention and FIGS. 10 to 22 are views referred to for describing various examples of the method for operating an image display apparatus, illustrated in FIG. 9.

Referring to FIG. 9, a 3D image is received (S910). The image input to the image display apparatus 100 may be, for example, a broadcast image based on a broadcast signal received from the tuner 110, an external image received from an external device, an image stored in the memory 140, or an image received from a content provider over a network.

If a stream containing the image carries information or a flag indicating whether the image is a 3D image, the controller 170 may acquire the information or flag by demultiplexing or decoding the stream and determine whether the image is a 3D image based on the acquired information or flag.

If the received image is a multi-viewpoint image, the controller 170 may determine whether the image includes left-eye and right-eye images to thereby determine whether the image is a 3D image.

Then, the APL of the 3D image is calculated (S915). The controller 170, particularly the APL calculator 455 of the controller 170 may calculate the APL of the input 3D image.

A picture level may represent luminance and an APL may be calculated on a frame basis or a block basis. Thus, if the APL of a frame or block is high, this means that the average luminance of the frame or block is high.

The brightness of a screen based on an APL will be described later with reference to FIGS. 12, 14 and 16.

The frame rate of the 3D image is converted (S920) and the depth of the 3D image is changed according to the calculated APL (S925). Then the depth-changed 3D image is arranged such that its left-eye image alternates with its right-eye image (S930). The gray level of a current frame is changed according to the gray level difference between the current frame and a previous frame in the input 3D image (S935) and the current frame with the changed gray level is displayed as an image (S940).

FIG. 10(a) illustrates video frames of 3D images processed by the video processor 420. It is noted from FIG. 10(a) that a 3D video frame 1010 is configured in the top/down format illustrated in FIG. 5(b).

The FRC 450 of the controller 170 may change the frame rate of the 3D image in step S920. For example, the FRC 450 changes 60 Hz to 120 Hz or 240 Hz or 480 Hz.

FIG. 10(b) illustrates an exemplary increase of the frame rate of a 3D image in the FRC 450. The FRC 450 may increase the frame rate of the 3D image by repeating a 3D video frame 1020. The top/down format of the 3D image may still be maintained.

While the frame rate is shown in FIG. 10(b) as increased four times, various settings are possible, such as doubling the frame rate. The frame rate conversion may be optional.

The formatter 460 changes the depth of the 3D image according to the APL calculated by the APL calculator 420 in step S925.

Figure 11:
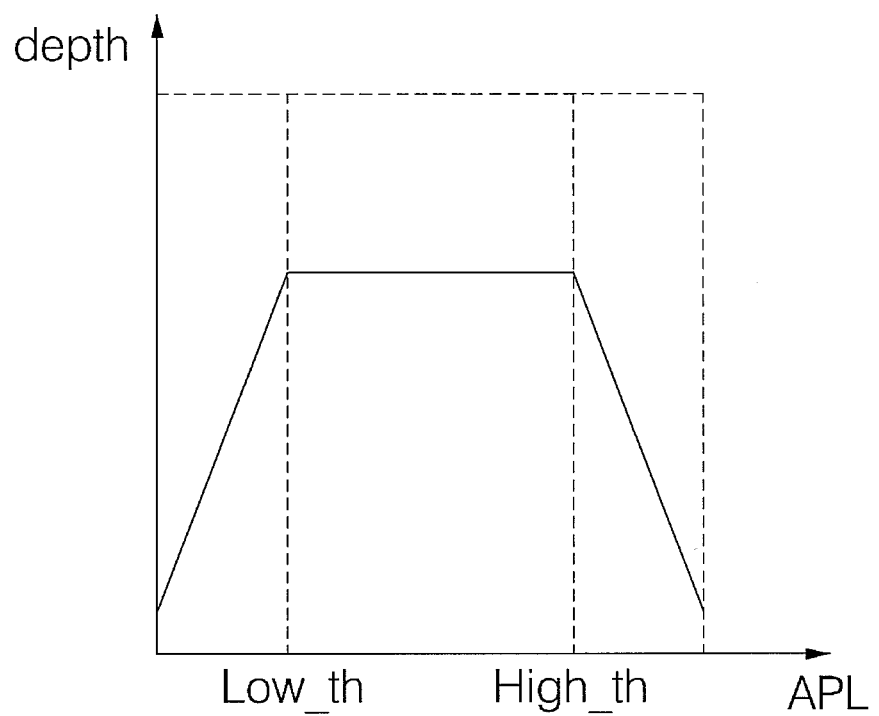

FIG. 11 is an exemplary graph illustrating depths which are set according to calculated APLs. For example, if an APL is equal to or lower than a first threshold Low_th or if the APL is equal to or higher than a second threshold High_th, a 3D video signal may be processed so that the depth of a 3D image corresponding to the 3D video signal is decreased.

Especially, if the calculated APL is equal to or lower than the first threshold Low_th, the formatter 460 may set the depth of the 3D image to be lower as the APL is more approximate to a lowest value (e.g. 0).

If the calculated APL is equal to or higher than the second threshold High_th, the formatter 460 may set the depth of the 3D image to be higher as the APL is more approximate to a highest value.

Control of the depth of a 3D image according to the calculated APL of the 3D image is related to overdriving of the liquid crystal panel, which will be described later with reference to FIG. 18.

During an overdriving operation for applying an additional voltage or gray level to increase the response speed of the liquid crystal panel as illustrated in FIG. 18, if the gray level of a 3D image is high (e.g. level 256) or low (e.g. level 0) as illustrated in FIG. 19, the 3D image may be displayed at gray level 256 or gray level 0 without overdriving. This phenomenon may occur during 2D and 3D visualization.

Particularly during 3D visualization, the overlap between a left-eye image and a right-eye image, called crosstalk, may occur with high probability. As a consequence, stereoscopic effects are mitigated.

To minimize the crosstalk, the depth of a 3D image is adjusted according to the APL of the 3D image calculated by the APL calculator 455 in an embodiment of the present invention.

As described before with reference to FIG. 11, if the APL of a 3D image is equal to or lower than the first threshold Low_th or equal to or higher than the second threshold High_th as a result of degraded crosstalk characteristics caused by inappropriate overdriving, it is preferred that the depth of the 3D image is changed, particularly decreased. Therefore, the crosstalk characteristics are improved during displaying the 3D image.

Control of the depth of a 3D image will be described later in detail with reference to FIGS. 12 to 17.

In step S930, the formatter 460 then alternates the left-eye image of the 3D image with the right-eye image of the 3D image, that is, in the frame sequential format illustrated in FIG. 5(c).

FIGS. 10(c) and 10(d) illustrate exemplary conversion of the format of the frame rate-changed 3D video frame into the frame sequential format in the formatter 460.

Referring to FIG. 10(c), a first left-eye video frame L1 1030, the first left-eye video frame L1, a first right-eye video frame R1, the first right-eye video frame R1, and a second left-eye video frame L2 are sequentially arranged. That is, identical left-eye video frames are successively arranged, followed by successive identical right-eye video frames.

Referring to FIG. 10(d), the first left-eye video frame L1 1030, a black frame 1040, the first right-eye video frame R1, a black frame, and the second left-eye video frame L2 are sequentially arranged. That is, a black frame is inserted between left-eye and right-eye video frames.

After the formatter 460 alternately arranges left-eye video frames and right-eye video frames, these frames are provided to the display 180.

FIGS. 12 to 17 illustrate examples of changing the depth of a 3D image according to the APL of the 3D image.

Figure 12:
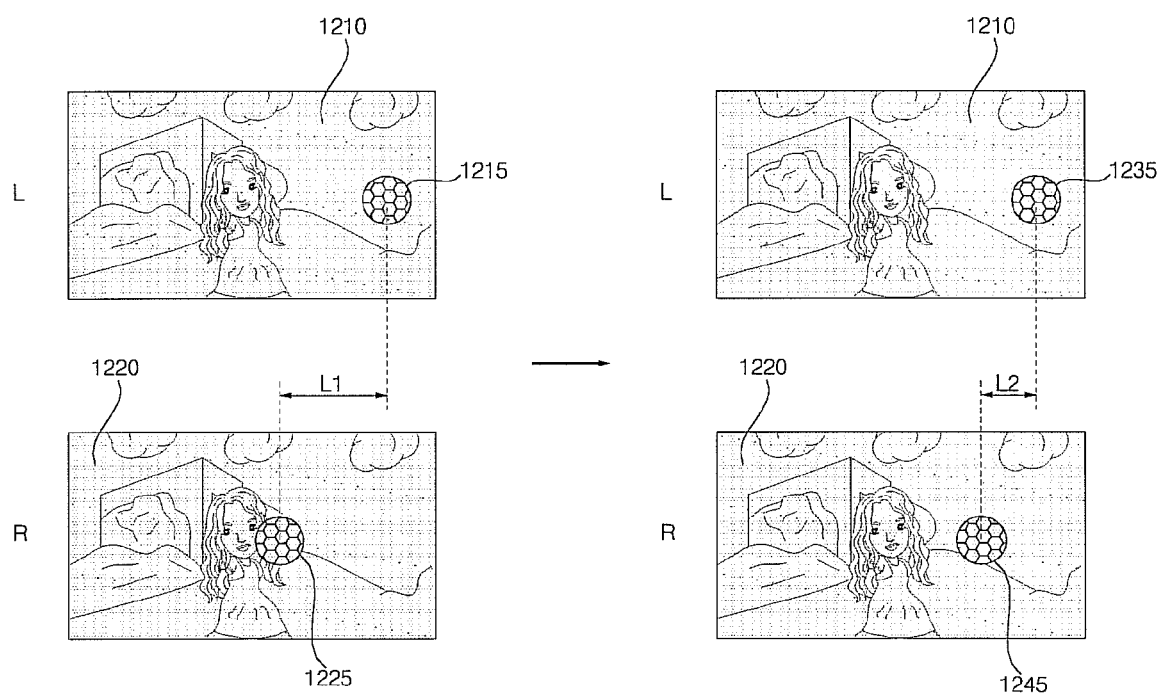
Figure 13:
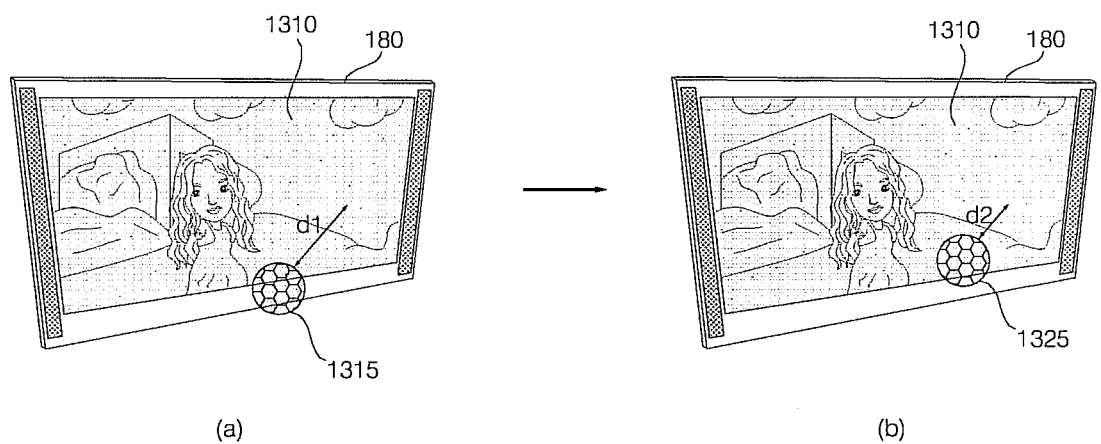

In the example of FIG. 12, the APLs of left-eye and right-eye images 1210 and 1220 are equal to or lower than the first threshold Low_th.

The left-eye and right-eye images 1210 and 1220 include 3D objects 1215 and 1225, respectively. When the user views the left-eye and right-eye images 1210 and 1220 and the 3D objects 1215 and 1225 with a 3D viewing device, he or she is tricked into perceiving an image 1310 and a 3D object 1315 having a specific depth d1 corresponding to a disparity L1 between the 3D objects 1215 and 1225 included in the left-eye and right-eye images 1210 and 1220 on the display 180, as illustrated in FIG. 13(a).

As stated before, the formatter 460 changes the depth d1 of the image 1310. That is, the formatter 460 decreases the disparity L1 between the 3D object 1215 in the left-eye image 1210 and the 3D object 1225 in the right-eye image 1220 to a disparity L2 between a 3D object 1235 in the left-eye image 1210 and a 3D object 1245 in the right-eye image 1220.

Therefore, the user views the image 1310 and a 3D object 1325 with a decreased depth d2 on the display 180 using the 3D viewing device, as illustrated in FIG. 13(b).

In the case where the APLs of the left-eye image 1210 and the right-eye image 1220 are equal to or lower than the first threshold Low_th, if the APLs get nearer to the lowest value (e.g. 0), the formatter 460 may set a lower disparity between the 3D object 1235 in the left-eye image 1210 and the 3D object 1245 in the right-eye image 1220. Consequently, the depth of the resulting 3D object 1325 gets smaller.

Figure 14:
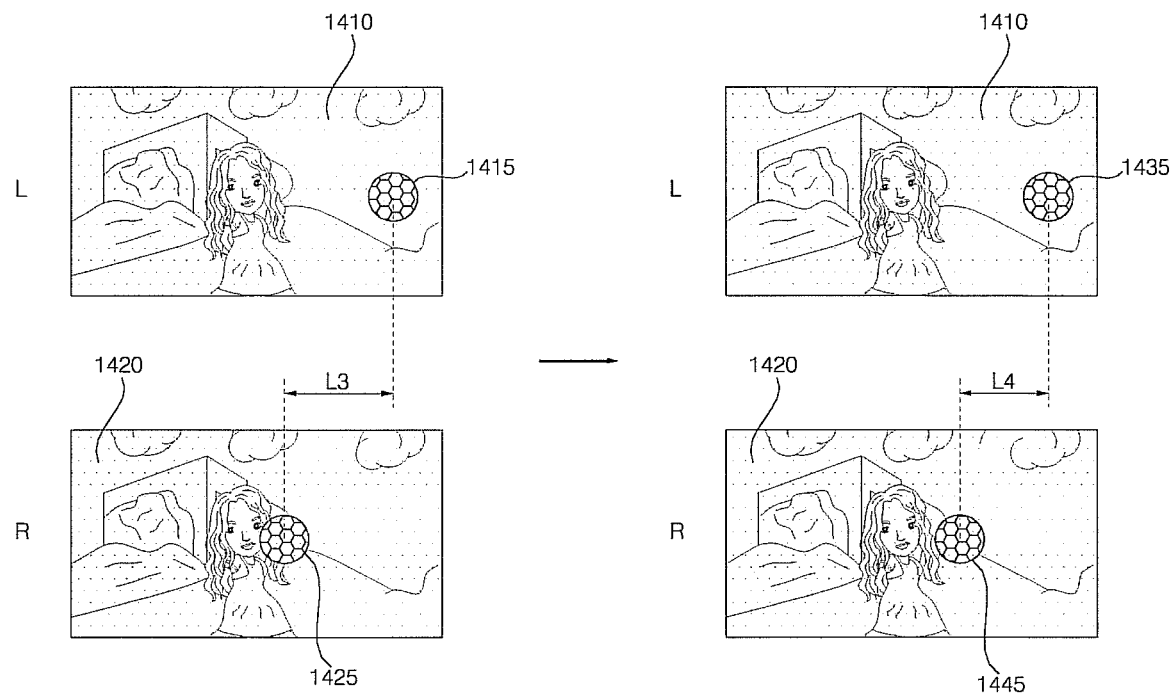
Figure 15:
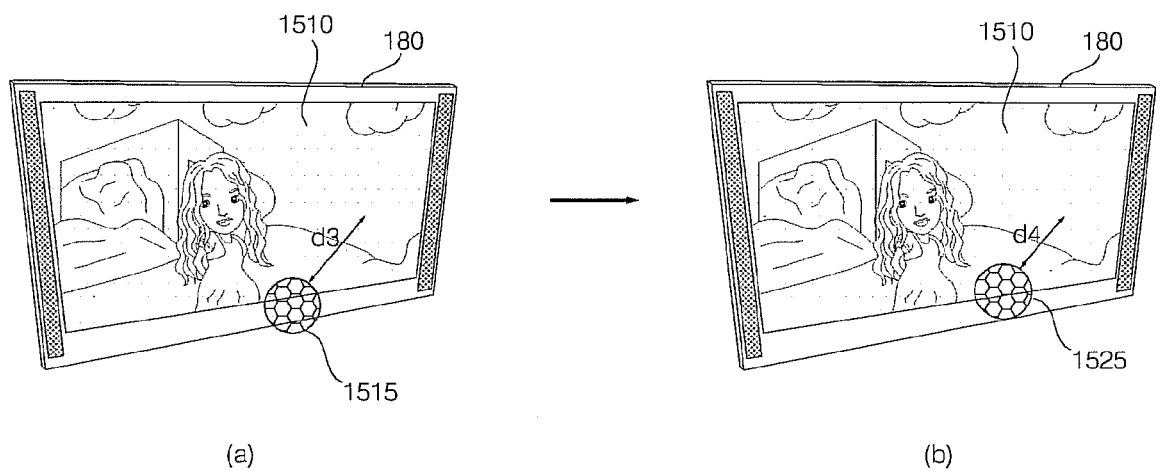

In the example of FIG. 14, the APLs of left-eye and right-eye images 1410 and 1420 are higher than the first threshold Low_th and lower than the second threshold High_th, as illustrated in FIG. 11.

The left-eye and right-eye images 1410 and 1420 include 3D objects 1415 and 1425, respectively. When the user views the left-eye and right-eye images 1410 and 1420 and the 3D objects 1415 and 1425 with the 3D viewing device, he or she is tricked into perceiving an image 1510 and a 3D object 1515 having a specific depth d3 corresponding to a disparity L3 between the 3D objects 1415 and 1425 included in the left-eye and right-eye images 1410 and 1420 on the display 180, as illustrated in FIG. 15(a).

As stated before, the formatter 460 changes the depth d3 of the 3D object 1515. That is, the formatter 460 decreases the disparity L3 between the 3D object 1415 in the left-eye image 1410 and the 3D object 1425 in the right-eye image 1420 to a disparity L4 between a 3D object 1435 in the left-eye image 1410 and a 3D object 1445 in the right-eye image 1420.

Therefore, the user views the image 1510 and a 3D object 1525 with a decreased depth d4 on the display 180 using the 3D viewing device, as illustrated in FIG. 15(b).

The depth d4 of the 3D object 1525 is greater than the depth 2 of the 3D object 1325 illustrated in FIG. 13(b).

In the case where the APLs of the left-eye image 1410 and the right-eye image 1420 are higher than the first threshold Low_th and lower than the second threshold High_th as illustrated in FIG. 11, the depth d3 of the 3D object 1515 may be maintained unchanged. Thus the image 1510 and the 3D object 1515 having the depth d3 are displayed without any change.

Figure 16:
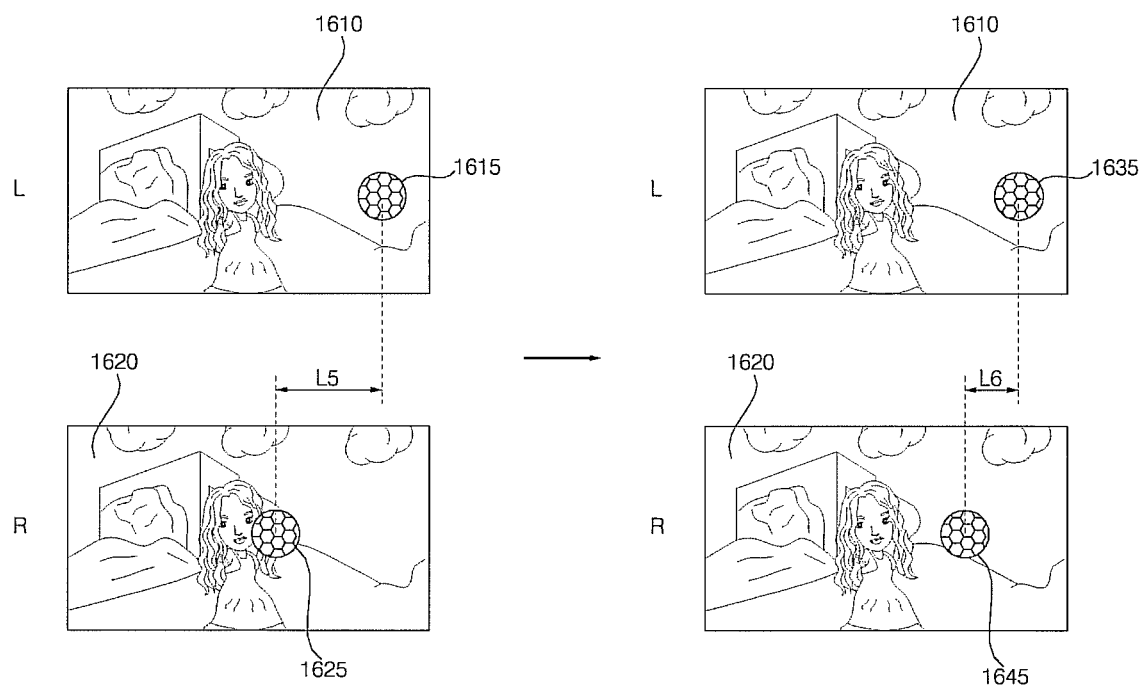
Figure 17:
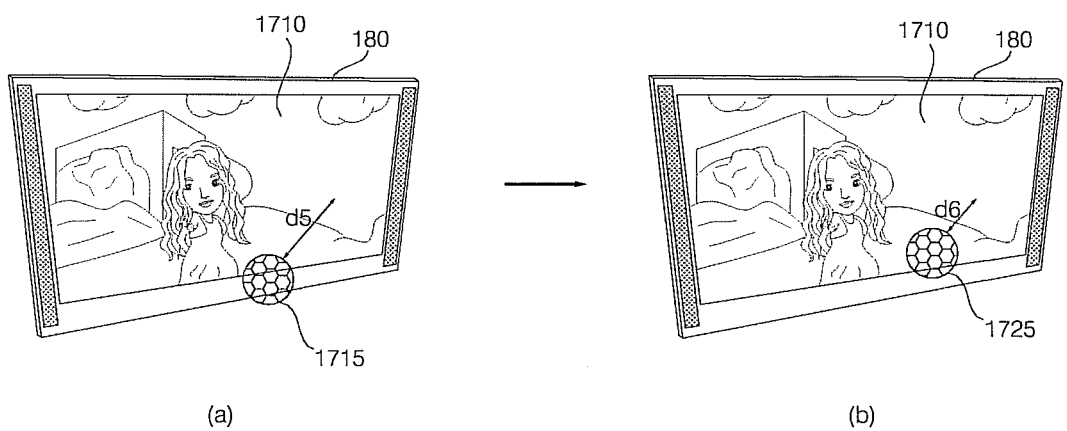

In the example of FIG. 16, the APLs of left-eye and right-eye images 1610 and 1620 are equal to or higher than the second threshold High_th, as illustrated in FIG. 11.

The left-eye and right-eye images 1610 and 1620 include 3D objects 1615 and 1625, respectively. When the user views the left-eye and right-eye images 1610 and 1620 and the 3D objects 1615 and 1625 with a 3D viewing device, he or she is tricked into perceiving an image 1610 and a 3D object 1615 having a specific depth d5 corresponding to a disparity L5 between the 3D objects 1615 and 1625 included in the left-eye and right-eye images 1610 and 1620 on the display 180, as illustrated in FIG. 17(a).

As stated before, the formatter 460 changes the depth d5 of the 3D object 1615. That is, the formatter 460 decreases the disparity L5 between the 3D object 1615 in the left-eye image 1610 and the 3D object 1625 in the right-eye image 1620 to a disparity L6 between a 3D object 1635 in the left-eye image 1610 and a 3D object 1645 in the right-eye image 1620.

Therefore, the user views the image 1710 and a 3D object 1725 with a decreased depth d6 on the display 180 using the 3D viewing device, as illustrated in FIG. 17(b).

In the case where the APLs of the left-eye image 1610 and the right-eye image 1620 are equal to or higher than the second threshold High_th, if the APLs get nearer to the highest value, the formatter 460 may set a lower disparity between the 3D object 1635 in the left-eye image 1610 and the 3D object 1645 in the right-eye image 1620. Consequently, the depth of the resulting 3D object 1725 gets smaller.

FIG. 18 is a view referred to for describing overdriving of the liquid crystal panel.

In view of hold-type characteristics in relation to the response speed of liquid crystals, the resulting discrepancy between display points of time on upper and lower sides of the liquid crystal panel 210 causes crosstalk.

FIG. 18(a) is a graph illustrating normal driving of the liquid crystal panel and FIG. 18(b) is a graph illustrating overdriving of the liquid crystal panel.

The graph of FIG. 18(a) illustrates a liquid crystal response speed L with respect to a voltage V applied to the liquid crystal panel. Referring to FIG. 18(a), when a first voltage $V_1$ lasts for a predetermined number of frames and then it is instantly raised to a second voltage $V_2$, the liquid crystal panel is not immediately responsive to the second voltage $V_2$, thereby producing a transition period such as a first period $T_1$. As the difference $V_{d1}$ between the first voltage $V_1$ and the second voltage $V_2$ is wider, the transition period gets longer. Consequently, motion blurring occurs, which makes graphics blurry on a video screen. In addition, the left-eye and right-eye images of a 3D image are overlapped, that is, crosstalk is created.

To prevent motion blurring and crosstalk, the liquid crystal panel is overdriven as illustrated in FIG. 18(b) according to an embodiment of the present invention.

The graph of FIG. 18(b) illustrates the liquid crystal response speed L with respect to the voltage V applied to the liquid crystal panel. Referring to FIG. 11(b), the first voltage $V_1$ is applied constantly for a predetermined number of frames and then it is instantly raised to a third voltage $V_3$ higher than the second voltage $V_2$. Then the third voltage $V_3$ is dropped to the second voltage $V_2$. In this manner, the slow response speed of liquid crystals is improved.

As noted from FIG. 18(b), the transition period is significantly shortened from the first period $T_1$ to a second period $T_2$. To shorten the transition period, the level of the third voltage $V_3$ is preferably further increased. This means that as the difference $V_{d2}$ between the second voltage $V_2$ and the third voltage $V_3$ is wider, the transition period gets shorter.

Because a voltage is applied to the liquid crystal panel in proportion to the gray level of a frame in FIG. 18, the following description will be given, centering on a gray level instead of an input voltage. In an embodiment of the present invention, the gray level of a frame is changed to overdrive the liquid crystal panel, which will be described later with reference to FIG. 19.

As mentioned before, after the left-eye and right-eye images of the 3D image are alternately arranged in step S930, the controller 170 or the memory 140 may transmit OD data for the 3D image to the gray level controller 300 of the timing controller 232 (S935). As described before with reference to FIG. 3, the look-up table 310 of the gray level controller 300 stores specific OD data based on the gray levels of a current frame and a previous frame.

The gray level setter 330 of the gray level controller 300 may set a gray level for the current frame frame_c according to the gray level difference between the current frame frame_c and the previous frame frame_b buffered in the frame buffer 320.

Referring to FIG. 19, for example, if the gray levels of the previous and current frames are 64 and 128, respectively, the gray level of the current frame may be increased to 139. Since overdriving is performed by increasing the gray level variation of a 3D image in this manner, crosstalk can be prevented, which might otherwise occur during 3D visualization.

In another example, if the gray levels of the previous and current frames are 128 and 64, respectively, the gray level of the current frame may be decreased to 53.

As stated before, if the current frame has the highest gray level 256 or the lowest gray level 0, its gray level is maintained unchanged irrespective of the gray level of the previous frame.

Figure 20:
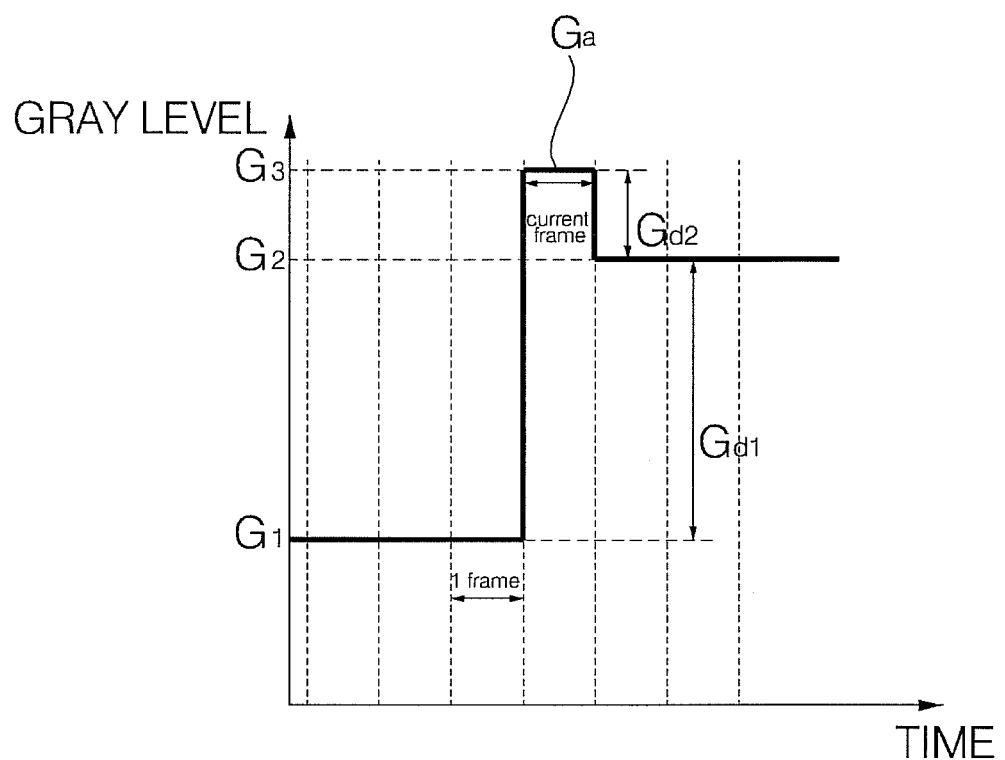

FIG. 20 is a graph illustrating an exemplary gray level $G_a$ of an input image during overdriving. Referring to FIG. 20, in the case where a first gray level $G_1$ is applied for a predetermined number of frames and then raised to a second gray level $G_2$ higher than the first gray level $G_1$, a third gray level $G_3$ higher than the second gray level $G_2$ may be set for overdriving in such a manner that a variation $G_{d2}$ from the second gray level $G_2$ to the third gray level $G_3$ is large.

As the difference $G_{d1}$ between the first gray level $G_1$ and the second gray level $G_2$ is wider, the third gray level $G_3$ may be set to be higher in FIG. 20. Therefore, overdriving can be more efficient. Since overdriving is performed by increasing a gray level variation in this manner, crosstalk may be prevented during 3D visualization.

Figure 21:
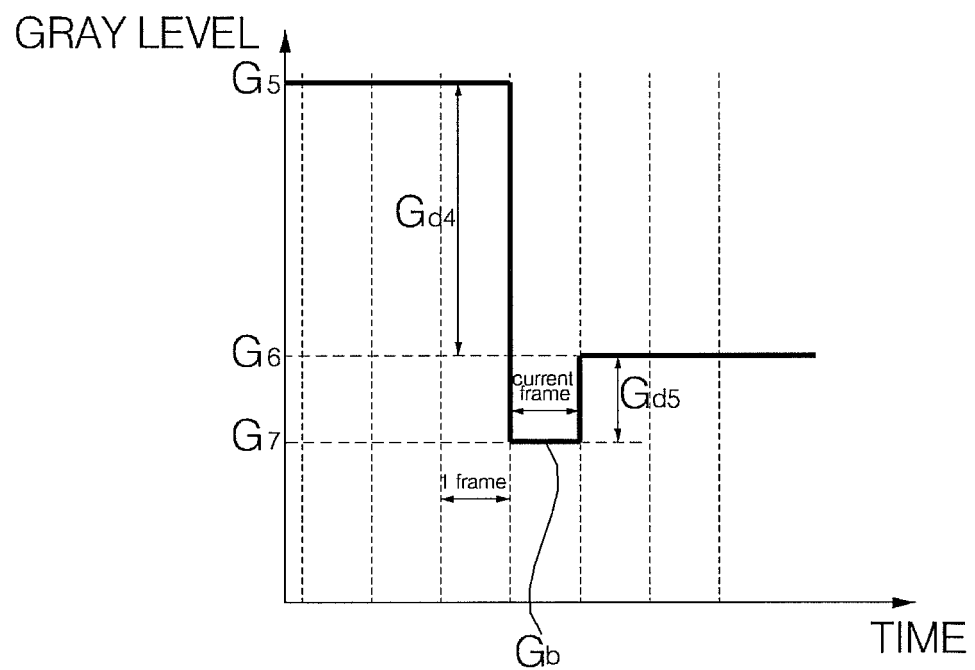

FIG. 21 is a graph illustrating another exemplary gray level $G_b$ of an input image during overdriving. Referring to FIG. 21, in the case where a fifth gray level $G_5$ is applied for a predetermined number of frames and then dropped to a sixth gray level $G_6$ lower than the fifth gray level $G_5$, a seventh gray level $G_7$ lower than the sixth gray level $G_6$ may be set for overdriving. That is, the seventh gray level $G_7$ is set in a manner that increases the difference $G_{d5}$ between the sixth gray level $G_6$ and the seventh gray level $G_7$.

As the difference $G_{d4}$ between the fifth gray level $G_5$ and the sixth gray level $G_6$ is wider, the seventh gray level $G_7$ may be set to be lower in FIG. 21. Therefore, overdriving can be more efficient.

Meanwhile, the gray level setter 330 may differentiate the gray level of the current frame frame_c according to the frame rate of the current frame frame_c. For example, the gray level variation of the current frame frame_c may be greater for a higher frame rate.

The image of the current frame having the changed gray level is displayed in step S940. For example, if the depth of a 3D image is changed according to the APL of the 3D image, the left-eye and right-eye images of the 3D image are sequentially displayed in the frame sequential format. For the image arrangement in the frame sequential format, the backlight lamps 252 are turned on in synchronization with each of the sequential left-eye and right-eye images. If the gray level of the 3D image is changed, the left-eye and right-eye images of the 3D image having the changed gray level are sequentially displayed.

Figure 22:
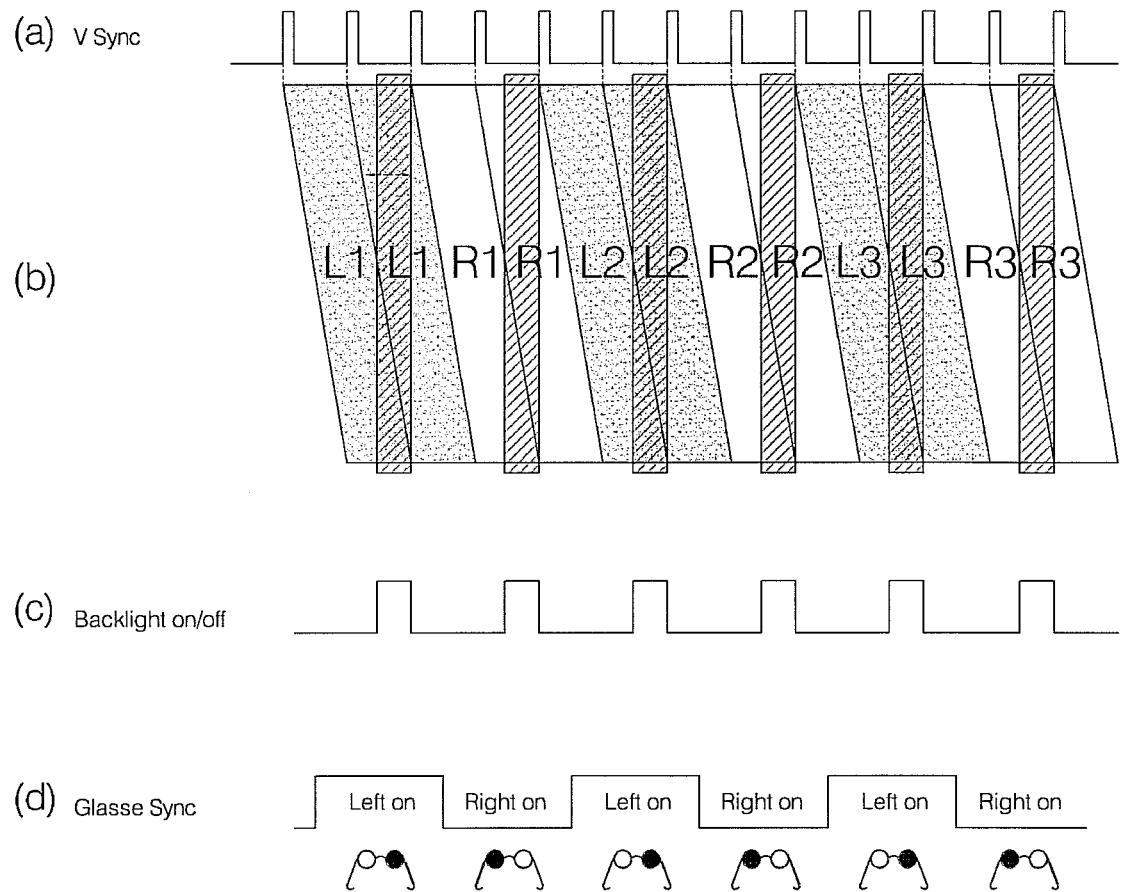

Referring to FIG. 22, while left-eye video frames and right-eye video frames are arranged in the format illustrated in FIG. 10(c) by the formatter 460, the backlight lamps 252 are turned on in synchronization with each of the left-eye and right-eye video frames.

FIG. 22(a) illustrates a vertical synchronization signal $V_{sync}$ indicating the display timing of each frame. FIG. 22(b) illustrates an example of, with the left-eye and right-eye video frames input to the liquid crystal panel 210, turning on the backlight lamps 252 in synchronization with the left-eye and right-eye video frames.

Referring to FIG. 22(b), the backlight lamps 252 are turned on during a part of the total length of successive left-eye video frames on the upper side of the liquid crystal panel 210 and are turned on during a part of the total length of successive right-eye video frames on the upper side of the liquid crystal panel 210. Therefore, crosstalk caused by overlapping between adjacent images, that is, the left-eye and right-eye images of a 3D image can be reduced. Further, the APL-based depth control or APL-based gray level control also contributes to crosstalk reduction.

In FIG. 22(b), in case of an edge type, the backlight lamps 252 are turned on simultaneously on the upper and lower sides of the liquid crystal panel 210. In case of a direct type, the backlight lamps 252 may be turned on simultaneously on the frontal surface of the liquid crystal panel 210.

FIG. 22(c) is a diagram illustrating the turn-on/off timing of the backlight lamps 252. Referring to FIG. 22(c), the backlight lamps 252 are turned on at a high level.

FIG. 22(d) is a diagram illustrating an operation signal timing of the 3D viewing device 195 being shutter glasses. According to the operation signal timing of the shutter glasses 195, only the left lens of the shutter glasses 195 is open when the left-eye video frames L1, L2 and L3 are displayed, and only the right lens of the shutter glasses 195 is open when the right-eye video frames R1, R2 and R3 are displayed.

Meanwhile, crosstalk can be reduced by turning on the backlight lamps 252 within each left-eye video frame and within each right-eye video frame during displaying a 3D image.

Figure 23:
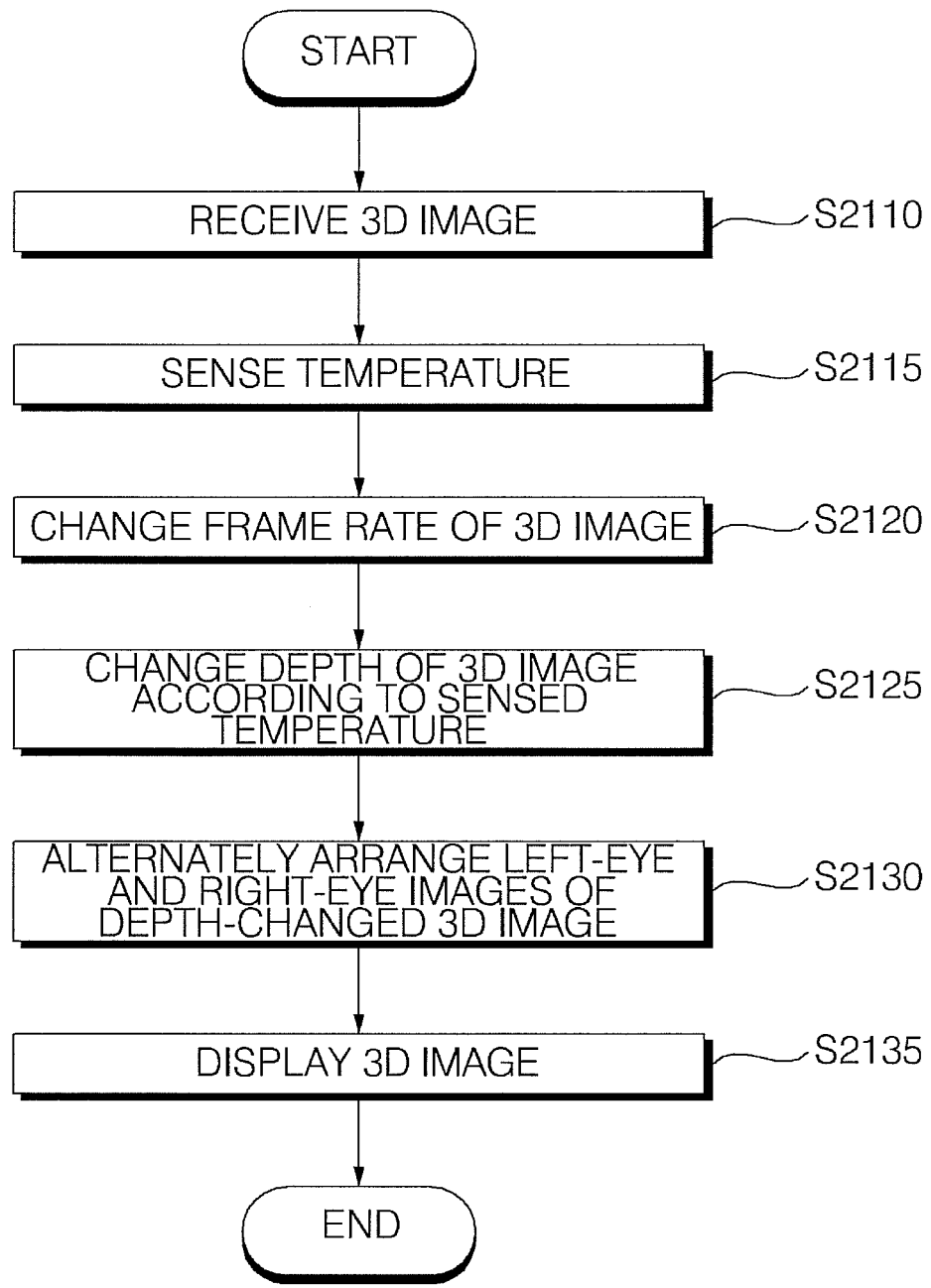
FIG. 23 is a flowchart illustrating a method for operating an image display apparatus according to another embodiment of the present invention.

FIG. 23 is a flowchart illustrating a method for operating an image display apparatus according to another embodiment of the present invention, and FIGS. 24 to 29 are views referred to for describing various examples of the method for operating an image display apparatus, illustrated in FIG. 23.

Referring to FIG. 23, a 3D image is received (S2110). The image input to the image display apparatus 100 may be, for example, a broadcast image based on a broadcast signal received from the tuner 110, an external image received from an external device, an image stored in the memory 140, or an image received from a content provider over a network.

If a stream containing the image carries information or a flag indicating whether the image is a 3D image, the controller 170 may acquire the information or flag by demultiplexing or decoding the stream and determine whether the image is a 3D image based on the acquired information or flag.

If the received image is a multi-viewpoint image, the controller 170 may determine whether the image includes left-eye and right-eye images to thereby determine whether the image is a 3D image.

Temperature is sensed (S2115). Specifically, the temperature sensor 183 senses the ambient temperature of the display 180. If the display 180 includes the liquid crystal panel 210, the temperature sensor 182 senses the ambient temperature of the liquid crystal panel 210. The sensed temperature may be input to the controller 170.

As temperature increases, the liquid crystal response speed of the liquid crystal panel may increase, and as temperature decreases, the liquid crystal response speed of the liquid crystal panel may decrease. The relationship between temperature and liquid crystal response speed will be described later with reference to FIGS. 24 and 25.

The frame rate of the 3D image is changed (S2120) and the depth of the 3D image is adjusted according to the sensed temperature (S2125). Then the left-eye image and right-eye image of the depth-changed 3D image are arranged alternately (S2130). Then the 3D image is displayed (S2135).

Specifically, the FRC 450 changes the frame rate of the 3D image in step S2120. For example, the FRC 450 changes 60 Hz to 120 Hz or 240 Hz or 480 Hz.

The formatter 460 arranges the left-eye and right-eye images of the 3D image alternately according to the temperature sensed by the temperature sensor 183 in step S2125.

FIG. 24 is graphs illustrating liquid crystal response speed and depth with respect to temperature.

FIG. 24(a) illustrates liquid crystal response speed versus temperature. Referring to FIG. 24(a), although the liquid crystal response speed is in a saturated state at or above a threshold temperature TH, the liquid crystal response speed increases in proportion to temperature below the threshold temperature TH. That is, when data is input, the liquid crystal response speed may be increased to a specific value in proportion to temperature. The liquid crystal response speed is decreased with lower temperature.

FIG. 24(b) illustrates depth versus temperature. Referring to FIG. 24(b), depth may be changed in proportion to a sensed temperature. Notably, the liquid crystal response speed is saturated at or above the threshold temperature TH as illustrated in FIG. 24(a). Therefore, the depth may be fixed to a specific value at or above the threshold temperature TH.

In accordance with the embodiment of the present invention, the depth of a 3D image is adjusted according to the temperature-based liquid crystal response speed.

The formatter 460 sets the depth of a 3D image in proportion to a sensed temperature, if the sensed temperature is equal to or lower than the threshold temperature TH.

With reference to FIGS. 26 to 29, control of the depth of a 3D image will be described later in greater detail.

Figure 25:
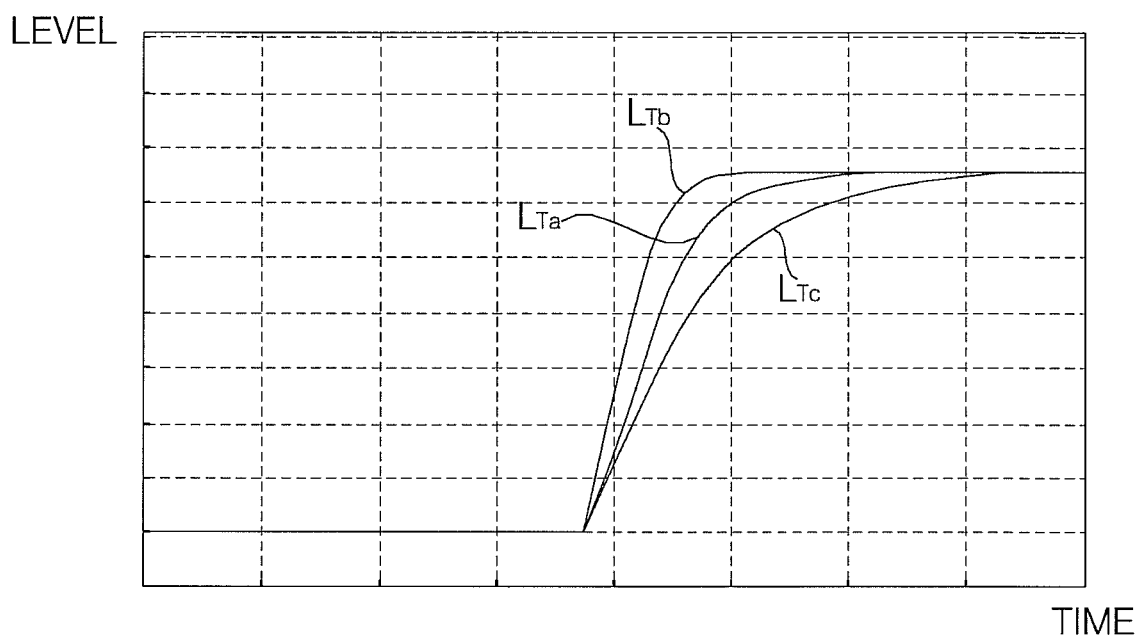

FIG. 25 illustrates the liquid crystal response time of the liquid crystal panel 210 with respect to temperature. Liquid crystal response curves at first, second and third temperatures $T_a$, $T_b$ and $T_c$ are denoted by $L_{Ta}$, $L_{Tb}$ and $L_{Tc}$, respectively.

Referring to FIG. 25, the response speed is highest on the liquid crystal response curve $L_{Tb}$ and lowest on the liquid crystal response curve $L_{Tc}$.

For example, the first temperature $T_a$ may be room temperature (about 27° C.) and the second temperature $T_b$ may be higher than the first temperature $T_a$, about 45° C. The third temperature $T_c$ may be lower than the first temperature $T_a$, for example, about 5° C.

In step S2130, the formatter 460 arranges the left-eye image and right-eye image of the depth-changed 3D image alternately, that is, in the frame sequential format illustrated in FIG. 5(c).

Then the sequential left-eye and right-eye video frames of the 3D image are provided to the display 180.

FIGS. 26 to 29 illustrate examples of changing the depth of a 3D image according to temperature.

Figure 26:
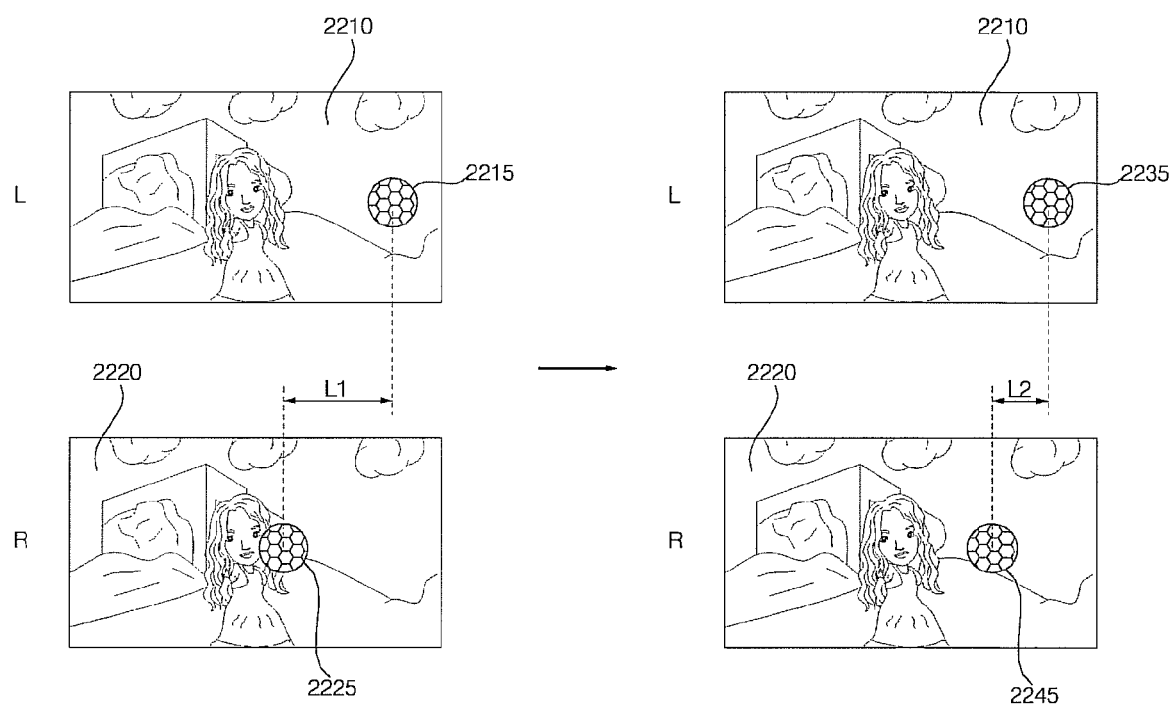
Figure 27:
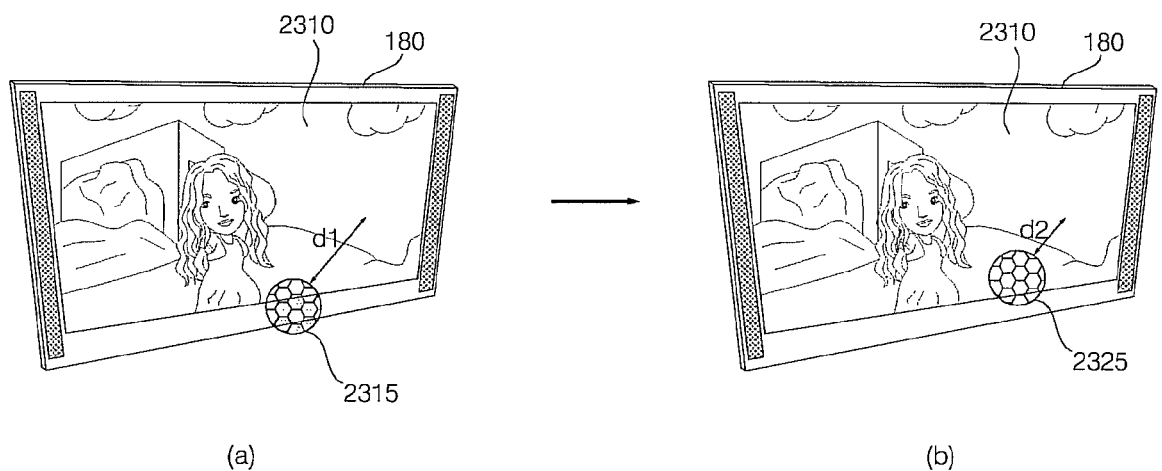

In the example of FIG. 26, a sensed temperature changes from the first temperature $T_a$ to the third temperature $T_c$.

If the sensed temperature is the first temperature $T_a$, a 3D image may have a first depth d1. For example, left-eye and right-eye images 2210 and 2220 include 3D objects 2215 and 2225, respectively. When the user views the left-eye and right-eye images 2210 and 2220 and the 3D objects 2215 and 2225 with the 3D viewing device, he or she is tricked into perceiving an image 2310 and a 3D object 2315 having the first depth d1 corresponding to a disparity L1 between the 3D objects 2215 and 2225 included in the left-eye and right-eye images 2210 and 2220 on the display 180, as illustrated in FIG. 27(a).

If the sensed temperature is the third temperature $T_c$ lower than the first temperature $T_a$, the formatter 460 decreases the depth of the 3D image. That is, the formatter 460 decreases the disparity L1 between the 3D object 2215 in the left-eye image 2210 and the 3D object 2225 in the right-eye image 2220 to a disparity L2 between a 3D object 2235 in the left-eye image 2210 and a 3D object 2245 in the right-eye image 2220, as illustrated in FIG. 26.

Therefore, the user views the image 2310 and a 3D object 2325 with a decreased second depth d2 on the display 180 using the 3D viewing device, as illustrated in FIG. 27(b).

Figure 28:
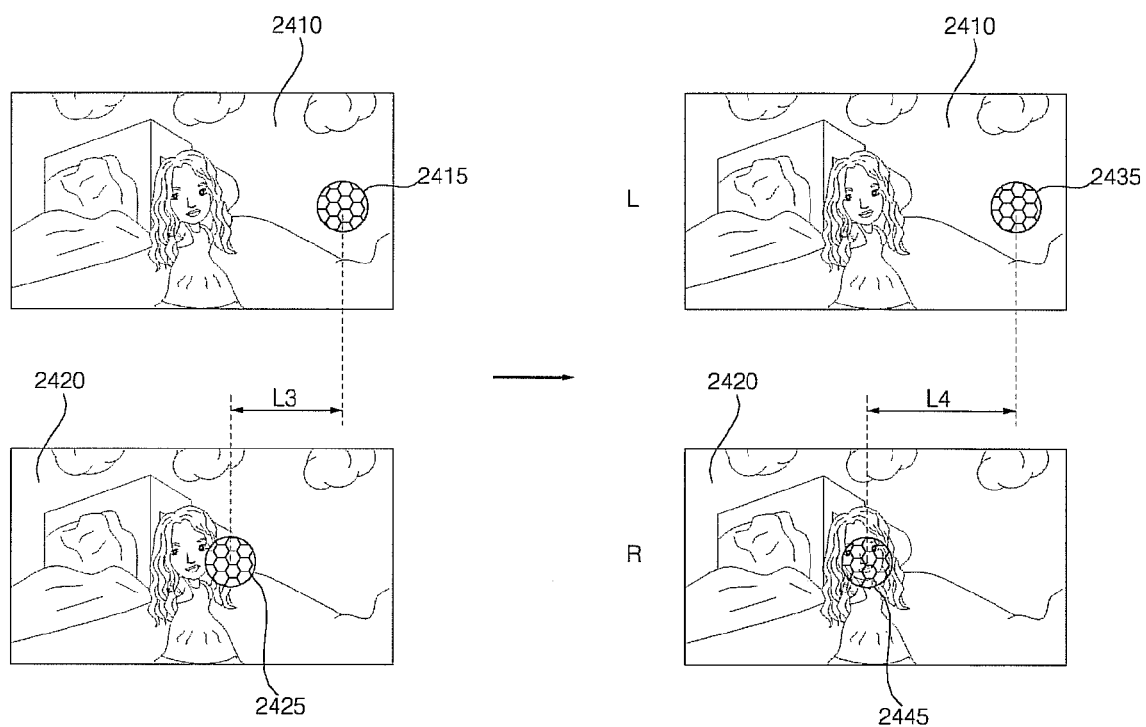
Figure 29:
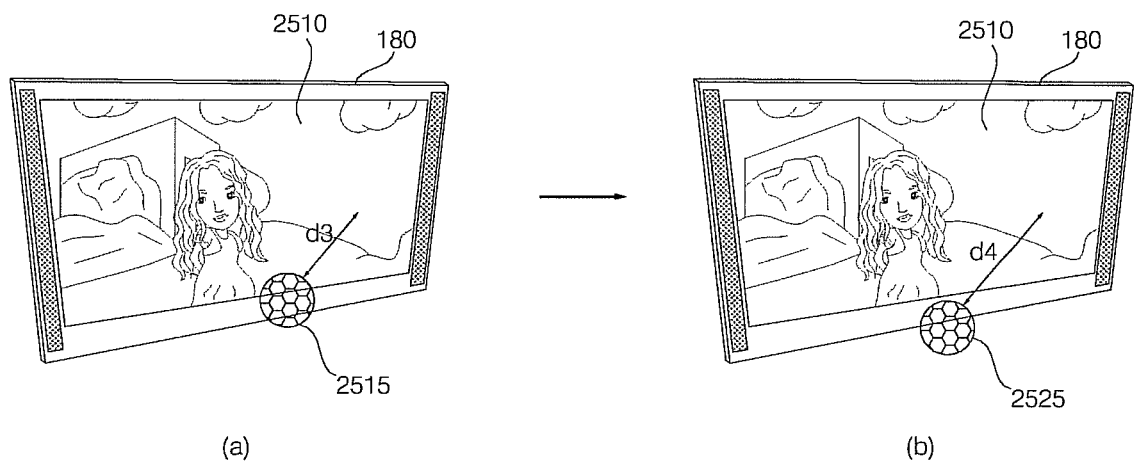

In the example of FIG. 28, the sensed temperature changes from the first temperature $T_a$ to the second temperature $T_b$.

If the sensed temperature is the first temperature $T_a$, a 3D image may have a third depth d3. For example, left-eye and right-eye images 2410 and 2420 include 3D objects 2415 and 2425, respectively. When the user views the left-eye and right-eye images 2410 and 2420 and the 3D objects 2415 and 2425 with a 3D viewing device, he or she is tricked into perceiving an image 2510 and a 3D object 2515 having the third depth d3 corresponding to a disparity L3 between the 3D objects 2415 and 2425 included in the left-eye and right-eye images 2410 and 2420 on the display 180, as illustrated in FIG. 29(a).

If the sensed temperature is the second temperature $T_b$ higher than the first temperature $T_a$, the formatter 460 increases the depth of the 3D image. That is, the formatter 460 increases the disparity L3 between the 3D object 2415 in the left-eye image 2410 and the 3D object 2425 in the right-eye image 2420 to a disparity L4 between a 3D object 2435 in the left-eye image 2410 and a 3D object 2445 in the right-eye image 2420, as illustrated in FIG. 28.

Therefore, the user views the image 2410 and a 3D object 2425 with an increased fourth depth d4 on the display 180 using the 3D viewing device, as illustrated in FIG. 29(b).

After the depth of a 3D image is changed according to temperature, overdriving may further be performed in the manner which has been described before with reference to FIGS. 18 to 21.

As is apparent from the above description of embodiments of the present invention, crosstalk can be reduced by adjusting the depth of a 3D image according to the APL of the 3D image.

Crosstalk can also be reduced by adjusting the depth of a 3D image according to a sensed temperature.

The gray level of an input image can be adjusted adaptively using overdriving, thereby preventing blurring.

When an image display apparatus adopts a hold-type liquid crystal panel, the left-eye and right-eye video frames of a 3D image are alternately arranged by increasing the frame rate of the 3D image. Therefore, crosstalk can be reduced.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus comprising:
a controller to change a depth of a three-dimensional (3D) image according to an Average Picture level (APL) of the 3D image; and
a display to display the 3D image having the changed depth,
wherein the controller includes
an APL calculator to calculate the APL of the input 3D image, and
a formatter to change a depth of the 3D image according to the calculated APL,
wherein when the calculated APL is equal to or lower than a first threshold, the formatter sets the depth of the 3D image to a smaller value as the APL is nearer to a lowest APL value,
wherein when the calculated APL is equal to or higher than a second threshold, the formatter sets the depth of the 3D image to a smaller value as the APL is nearer to a highest APL value, and wherein when the calculated APL is higher than the first threshold and lower than second threshold, the formatter sets the depth of the 3D image to be maintained without any change.

2. The image display apparatus according to claim 1, wherein the controller further comprises a frame rate converter to convert a frame rate of the received 3D image, wherein the formatter changes a depth of the 3D image having the changed frame rate according to the calculated APL.

3. The image display apparatus according to claim 1, wherein the controller further comprises a gray level controller to change a gray level of a current frame of the 3D image having the changed depth according to a gray level difference between the current frame and a previous frame of the 3D image having the changed depth.

4. The image display apparatus according to claim 3, wherein the gray level converter changes the gray level of the current frame according to the gray level difference between the current frame and the previous frame, referring to a look-up table having gray level data.

5. The image display apparatus according to claim 1, further comprising a temperature sensor to sense temperature,
wherein the formatter changes the depth of the 3D image according to the sensed temperature.

6. The image display apparatus according to claim 1, wherein the controller includes a frame rate converter to convert a frame rate of the received 3D image,
wherein successive left-eye video frames and successive right-eye video frames image of the frame rate-changed 3D image are arranged alternately, and
wherein backlight lamps of the image display apparatus are turned on during a part of the total length of successive left-eye video frames and during a part of the total length of successive right-eye video frames.

7. The image display apparatus according to claim 6, wherein on-periods in a second left-eye video frame of successive left-eye video frames are overlapped.

8. The image display apparatus according to claim 1, wherein the depth of the 3D image is a perceived 3D depth of the 3D image relative a surface of the display.

9. An image display apparatus comprising:
a temperature sensor to sense temperature;
a controller to change a depth of a three-dimensional (3D) image according to the sensed temperature; and
a display to display the 3D image having the changed depth,
wherein the controller includes a formatter to change the depth of the 3D image according to the sensed temperature,
wherein when the sensed temperature is equal to or lower than a threshold, the formatter sets the depth of the 3D image to be changed in proportion to the sensed temperature, and
wherein when the sensed temperature is higher than the threshold, the formatter sets the depth of the 3D image to a prescribed value.

10. The image display apparatus to claim 9, wherein the controller changes a gray level of a current frame of the 3D image having the changed depth according to a gray level difference between the current frame and a previous frame of the 3D image having changed depth.

11. The image display apparatus according to claim 9, wherein the controller further includes a frame rate converter to convert a frame rate of the received 3D image,
wherein successive left-eye video frames and successive right-eye video frames image of the frame rate-changed 3D image are arranged alternately, and
wherein backlight lamps of the image display apparatus are turned on during a part of the total length of successive left-eye vide frames and during a part of the total length of successive right-eye video frames.

12. The image display apparatus according to claim 11, wherein on-periods in a second left-eye video frame of successive left-eye video frames are overlapped.

13. The image display apparatus according to claim 9, wherein the depth of the 3D image is a perceived 3D depth of the 3D image relative a surface of the display.

* * * * *